(12) United States Patent
Dong et al.

(10) Patent No.: US 12,267,811 B2
(45) Date of Patent: Apr. 1, 2025

(54) COMMUNICATIONS METHOD AND COMMUNICATIONS APPARATUS

(71) Applicant: Huawei Technologies Co., Ltd., Shenzhen (CN)

(72) Inventors: Lei Dong, Shanghai (CN); Lei Lu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 339 days.

(21) Appl. No.: 17/886,214

(22) Filed: Aug. 11, 2022

(65) Prior Publication Data
US 2022/0386278 A1    Dec. 1, 2022

Related U.S. Application Data

(63) Continuation of application No. PCT/CN2020/075440, filed on Feb. 14, 2020.

(51) Int. Cl.
*H04W 72/02* (2009.01)
*H04W 72/0446* (2023.01)
(Continued)

(52) U.S. Cl.
CPC ....... *H04W 72/02* (2013.01); *H04W 72/0446* (2013.01); *H04W 72/0453* (2013.01); *H04W 72/20* (2023.01)

(58) Field of Classification Search
CPC ........ H04W 72/02; H04W 72/20; H04L 12/50
(Continued)

(56) References Cited

U.S. PATENT DOCUMENTS 9,466,296 B2    10/2016    Kaplan et al.
9,575,720 B2    2/2017     Faaborg et al.
(Continued)

FOREIGN PATENT DOCUMENTS

CN    110535611 A    12/2019
EP    3962219 A1     3/2022
(Continued)

OTHER PUBLICATIONS

"NR sidelink physical layer structure," 3GPP TSG RAN WG1 #99, Reno, USA, R1-1912514, pp. 1-12, 3rd Generation Partnership Project, Valbonne, France (Nov. 18-22, 2019).
(Continued)

*Primary Examiner* — Dang T Ton
(74) *Attorney, Agent, or Firm* — Leydig, Voit & Mayer, Ltd.

(57) ABSTRACT

A communications method is described that includes a first terminal apparatus determining control information, where the control information includes a first field, and a value of the first field is used to indicate a quantity of first frequency domain units, a first start frequency domain unit index, and a second start frequency domain unit index; and the quantity of first frequency domain units is a quantity of frequency domain units included in a first data channel, a second data channel, or a third data channel, the first start frequency domain unit index is a start frequency domain unit index of the second data channel, and the second start frequency domain unit index is a start frequency domain unit index of the third data channel. The first terminal apparatus sends the control information and the first data channel to a second terminal apparatus in a first time unit.

20 Claims, 10 Drawing Sheets

(51) Int. Cl.
*H04W 72/0453* (2023.01)
*H04W 72/20* (2023.01)

(58) Field of Classification Search
USPC ........................................ 370/329, 401, 403
See application file for complete search history.

(56) References Cited

U.S. PATENT DOCUMENTS

2019/0394757 A1* 12/2019 Zhang ................. H04W 72/044
2020/0045715 A1 2/2020 Li et al.

FOREIGN PATENT DOCUMENTS

EP 4016905 A1 6/2022
WO 2020033622 A1 2/2020

OTHER PUBLICATIONS

"Discussion on sidelink physical layer structure," 3GPP TSG RAN WG1 #98bis, Chongqing, China, R1-1911065, Total 14 pages, 3rd Generation Partnership Project, Valbonne, France (Oct. 14-20, 2019).
"3rd Generation Partnership Project; Technical Specification Group Radio Access Network; NR; Multiplexing and channel coding (Release 16)," 3GPP TS 38.212 V16.0.0, pp. 1-145, 3rd Generation Partnership Project, Valbonne, France (Dec. 2019).
"3rd Generation Partnership Project; Technical Specification Group Radio Access Network; NR; Physical layer procedures for control (Release 16)," 3GPP TS 38.213 V16.0.0, pp. 1-146, 3rd Generation Partnership Project, Valbonne, France (Dec. 2019).
"3rd Generation Partnership Project; Technical Specification Group Radio Access Network; NR; Physical layer procedures for data (Release 16)," 3GPP TS 38.214 V16.0.0, pp. 1-147, 3rd Generation Partnership Project, Valbonne, France (Dec. 2019).
"3rd Generation Partnership Project; Technical Specification Group Radio Access Network; NR; Medium Access Control (MAC) protocol specification (Release 15)," 3GPP TS 38.321 V15.8.0, pp. 1-78, 3rd Generation Partnership Project, Valbonne, France (Dec. 2019).
ZTE, Sanechips, "NR sidelink physical layer structure," 3GPP TSG RAN WG1 #98bis, Chongqing, China, R1-1910297, pp. 1-16, 3rd Generation Partnership Project, Valbonne, France (Oct. 14-20, 2019).

* cited by examiner

COMMUNICATIONS METHOD AND COMMUNICATIONS APPARATUS

CROSS-REFERENCE TO RELATED APPLICATIONS

This application is a continuation of International Application No. PCT/CN2020/075440, filed on Feb. 14, 2020, the disclosure of which is hereby incorporated by reference in its entirety.

TECHNICAL FIELD

Embodiments of this application relate to the communications field, and in particular, to a communications method and a communications apparatus.

BACKGROUND

With development of wireless communications technologies, a demand for people to communicate with surrounding people or things gradually increases. Therefore, in a Long Term Evolution (LTE) network in the 3rd generation partnership project (3GPP) technology, a vehicle-to-everything (V2X) communications technology is proposed, including vehicle to vehicle (V2V) communication, vehicle to pedestrian (V2P) communication, vehicle to infrastructure (V2I) communication, and vehicle to network (V2N) communication.

In LTE-V2X, V2X communication may be performed between terminal apparatuses. The terminal apparatus may send sidelink control information (SCI) to indicate a time-frequency location of a physical sidelink shared channel (PSSCH). Specifically, a higher-layer parameter in LTE-V2X is $N_{MAX}=2$. A transmit-side terminal apparatus can indicate time-frequency locations of a maximum of two PSSCHs by using the SCI, and a receive-side terminal apparatus can determine the time-frequency location of the PSSCH based on the SCI.

In new radio (NR)-V2X, the higher-layer parameter $N_{MAX}$ may be configured as 3. The existing SCI of the terminal apparatus can indicate time-frequency locations of a maximum of two PSSCHs, which cannot meet a requirement of NR-V2X.

SUMMARY

Embodiments of this application provide a communications method and a communications apparatus. SCI can indicate time-frequency locations of a maximum of three PSSCHs, which can meet a requirement of NR-V2X.

According to a first aspect, a communications method is provided, including: A first terminal apparatus determines control information, where the control information includes a first field, and a value of the first field is used to indicate a quantity of first frequency domain units, a first start frequency domain unit index, and a second start frequency domain unit index; and the quantity of first frequency domain units is a quantity of frequency domain units included in a first data channel, a second data channel, or a third data channel, the first start frequency domain unit index is a start frequency domain unit index of the second data channel, and the second start frequency domain unit index is a start frequency domain unit index of the third data channel. The first terminal apparatus sends the control information and the first data channel to a second terminal apparatus in a first time unit.

This embodiment of this application provides a communications method. The first terminal apparatus may indicate two start frequency domain unit indexes and a quantity of frequency domain units by using the first field in the control information, may indicate two data channels based on the two start frequency domain unit indexes and the quantity of frequency domain units, and may indicate one data channel based on the quantity of frequency domain units and a start frequency domain unit of a frequency domain resource on which the first terminal apparatus sends the control information. It may be learned that the control information (e.g., SCI) in this embodiment of this application can indicate a maximum of three data channels (e.g., PSSCHs), which supports a scenario in which a higher-layer parameter $N_{MAX}$ is 3, and meets a requirement of NR-V2X.

With reference to the first aspect, in a first possible implementation of the first aspect, that the first terminal apparatus determines control information includes: The first terminal apparatus determines the value of the first field based on the first start frequency domain unit index, the second start frequency domain unit index, the quantity of first frequency domain units, and a quantity of frequency domain units included in a sidelink resource pool.

This embodiment of this application provides specific implementation in which the control information indicates frequency domain resources of three data channels.

With reference to the first possible implementation of the first aspect, in a second possible implementation of the first aspect, the value of the first field is determined based on one or more of $(N-L+1) \times n^{start1} + n^{start2}$, $(N-L+1)$, $(L-2)$, $Y^2$, $N$, and $(N-L+1) \times n^{start1}$, where $n^{start1}$ is the start frequency domain unit index of the second data channel, $n^{start2}$ is the start frequency domain unit index of the third data channel, $N$ is the quantity of frequency domain units included in the sidelink resource pool, $L$ is the quantity of first frequency domain units, and $Y$ is related to $N$ and/or $L$.

This embodiment of this application provides parameters related to a frequency domain resource of a data channel to determine the value of the first field based on these parameters, and frequency domain resources of a maximum of three data channels can be indicated.

With reference to the second possible implementation of the first aspect, in a third possible implementation of the first aspect, the value of the first field meets the following:

when $(L-1) \leq \lfloor N/2 \rfloor$ and $L=1$, $FRIV=(N-L+1) \times n^{start1} + n^{start2}$; and/or when $(L-1) \lfloor N/2 \rfloor$ and $L>1$, $FRIV=\Sigma_{i=0}^{L-2}(N-1)^2 + \Sigma_{i=0}^{L-2}i^2 + (N-L+1) \times n^{start1} + n^{start2}$; and/or when $(L-1) < \lfloor N/2 \rfloor$, $FRIV=\Sigma_{i=0}^{N-L+1}(N-i)^2 + \Sigma_{i=0}^{N-L+1}i^2 - 1 - ((N-L+1) \times n^{start1} + n^{start2})$, where the FRIV represents the value of the first field.

This embodiment of this application provides a possible method for determining a first field, to indicate a frequency domain resource of a data channel by using the first field.

With reference to the first aspect or the first to the third possible implementations of the first aspect, in a fourth possible implementation of the first aspect, the control information further includes a second field, where a value of the second field is used to determine a second time unit carrying the second data channel and a third time unit carrying the third data channel.

In this embodiment of this application, the control information may further indicate two time units, and the two time units may be used to determine a time domain resource of a data channel, to indicate three data channels by using the control information.

With reference to the fourth possible implementation of the first aspect, in a fifth possible implementation of the first aspect, that the first terminal apparatus determines control information further includes:

determining the value of the second field based on a first time domain interval $T_{gap1}$ and a second time domain interval $T_{gap2}$, where the first data channel, the second data channel, and the third data channel are located in different time units; and the first time domain interval $T_{gap1}$ is an interval between the first time unit and the second time unit, and the second time domain interval $T_{gap2}$ is an interval between the first time unit and the third time unit; or the first time domain interval $T_{gap1}$ is the interval between the first time unit and the second time unit, and the second time domain interval $T_{gap2}$ is an interval between the second time unit and the third time unit.

This embodiment of this application provides specific implementation in which the control information indicates time domain resource of three data channels.

With reference to the fifth possible implementation of the first aspect, in a sixth possible implementation of the first aspect, the determining the value of the second field based on a first time domain interval $T_{gap1}$ and a second time domain interval $T_{gap2}$ includes:

when $(T_{gap2}-1) \leq \lfloor N_{slot}/2 \rfloor$, $TRIV=N_{slot}*(T_{gap2}-1)+T_{gap1}+W$ or $TRIV=N_{slot}*(T_{gap2}-1)+T_{gap1}$; and when $(T_{gap2}-1)>\lfloor N_{slot}/2 \rfloor$, $TRIV=N_{slot}*(N_{slot}-T_{gap2}+1)+(N_{slot}-1-T_{gap1})+W$ or $TRIV=N_{slot}*(N_{slot}-T_{gap2}+1)+(N_{slot}-1-T_{gap1})$.

The TRIV represents the value of the second field; the parameter W is a first time window, and the first time unit, the second time unit, or the third time unit is located in the first time window; and $N_{slot}$ is a maximum value of the first time domain interval or the second time domain interval, where $N_{slot}=W-2$, $0 \leq T_{gap1} \leq N_{slot}-1$, and $1 \leq T_{gap2} \leq N_{slot}$.

This embodiment of this application provides specific implementation of the value of the second field, to indicate a time domain resource of a data channel by using the second field.

With reference to any one of the first aspect or the first to the sixth possible implementations of the first aspect, in a seventh possible implementation of the first aspect, the control information further includes a third field, where when the third field has a first value, a time unit of the first data channel is before a time unit of the second data channel and a time unit of the third data channel; when the third field has a second value, the time unit of the first data channel is between the time unit of the second data channel and the time unit of the third data channel; and when the third field has a third value, the time unit of the first data channel is after the time unit of the second data channel and the time unit of the third data channel.

This embodiment of this application provides the third field to indicate, by using the third field, a time domain order of the three data channels indicated by the control channel.

According to a second aspect, a communications method is disclosed, including: A second terminal apparatus receives, in a first time unit, control information and a first data channel that are sent by a first terminal apparatus, where the control information includes a first field. The second terminal apparatus determines a quantity of first frequency domain units, a first start frequency domain unit index, and a second start frequency domain unit index based on a value of the first field, where the quantity of first frequency domain units is a quantity of frequency domain units included in the first data channel, a second data channel, or a third data channel, the first start frequency domain unit index is a start frequency domain unit index of the second data channel, and the second start frequency domain unit index is a start frequency domain unit index of the third data channel.

This embodiment of this application provides a communications method. The second terminal apparatus may determine two start frequency domain unit indexes and a quantity of frequency domain units by using the first field in the control information, may determine two data channels based on the two start frequency domain unit indexes and the quantity of frequency domain units, and may determine one data channel based on the quantity of frequency domain units and a start frequency domain unit of a frequency domain resource on which the first terminal apparatus sends the control information. It may be learned that the control information (e.g., SCI) in this embodiment of this application can indicate a maximum of three data channels (e.g., PSSCHs), which supports a scenario in which a higher-layer parameter $N_{MAX}$ is 3, and meets a requirement of NR-V2X.

With reference to the second aspect, in a first possible implementation of the second aspect, that the second terminal apparatus determines a quantity of first frequency domain units, a first start frequency domain unit index, and a second start frequency domain unit index based on a value of the first field includes:

calculating a value interval based on a parameter l; and when the value FRIV of the first field belongs to the value interval, determining the quantity L of first frequency domain units based on N and the parameter 1, and determining the first start frequency domain unit index $n^{start1}$ and the second start frequency domain unit index $n^{start2}$ based on the FRIV, the quantity L of first frequency domain units, and N; and when the FRIV does not belong to the value interval, updating the parameter l to (l+1), until the FRIV belongs to a value interval corresponding to an updated parameter l.

The parameter $$l = 1, \dots, \left\lfloor \frac{N}{2} \right\rfloor + 1,$$

and N is a quantity of frequency domain units included in a sidelink resource pool.

With reference to the second aspect and any possible implementation of the first aspect, in a second possible implementation of the second aspect, a start value of the value interval is $f_l^s$, and an end value of the value interval is $f_l^e$.

The calculating a value interval based on a parameter l includes:

when the parameter l=1, the start value $f_l^s=0$, and the end value $f_l^e = \Sigma_{i=0}^{l+1-2}(N-i)^2 + \Sigma_{i=0}^{l+1-2}i^2 - 1$;

when the parameter $$l = 2, \dots, \left\lfloor \frac{N}{2} \right\rfloor,$$

the start value $f_l^s = \Sigma_{l-2}(N-i)^2 + \Sigma_{i=0}^{l-2}i^2$, and the end value $f_l^e = \Sigma_{i=0}^{l+1-2}(N-i)^2 + \Sigma_{i=0}^{l+1-2}i^2 - 1$; and when the parameter $$l = \left\lfloor \frac{N}{2} \right\rfloor + 1,$$

the start value $f_t^s=\Sigma_{i=0}^{l-2}(N-i)^2+\Sigma_{i=0}^{l-1-2} i^2$, and the end value $$f_t^e = N*(N+1)*\frac{(2*N+1)}{6} - 1.$$

With reference to the second aspect and any possible implementation of the first aspect, in a third possible implementation of the second aspect, the determining the quantity L of first frequency domain units based on N and the parameter 1, and determining the first start frequency domain unit index $n^{start1}$ and the second start frequency domain unit index $n^{start2}$ based on the FRIV, the quantity L of first frequency domain units, and N includes:

if the FRIV is less than or equal to $f_t^s+(N-(l-1))^2-1$, L=1, $n^{start1}=\lfloor(FRIV-f_t^s)/(N-L+1)\rfloor$, and $n^{start2}=(FRIV-f_t^s)-n^{start1}*(N-L+1)$; and if the FRIV is greater than $f_t^s+(N-(l-1))^2-1$, L=N-l+2, $n^{start1}=\lfloor(f_t^e-FRIV)/(N-L+1)\rfloor$, and $n^{start2}=(f_t^e-FRIV)-n^{start1}*(N-L+1)$.

With reference to the second aspect and any possible implementation of the first aspect, in a fourth possible implementation of the second aspect, the control information further includes a second field, where a value of the second field is used to determine a second time unit carrying the second data channel and a third time unit carrying the third data channel.

With reference to the second aspect and any possible implementation of the first aspect, in a fifth possible implementation of the second aspect, the method further includes:

determining a first time domain interval $T_{gap1}$ and a second time domain interval $T_{gap2}$ based on the value of the second field, where the first data channel, the second data channel, and the third data channel are located in different time units; and the first time domain interval $T_{gap1}$ is an interval between the first time unit and the second time unit, and the second time domain interval $T_{gap2}$ is an interval between the first time unit and the third time unit; or the first time domain interval $T_{gap1}$ is the interval between the first time unit and the second time unit, and the second time domain interval $T_{gap2}$ is an interval between the second time unit and the third time unit.

With reference to the second aspect and any possible implementation of the first aspect, in a sixth possible implementation of the second aspect, the determining a first time domain interval $T_{gap1}$ and a second time domain interval $T_{gap2}$ based on the value of the second field includes:

calculating a value x of $\lfloor TRVI/N_{slot}\rfloor+TRVI \% N_{slot}$, where when $x<N_{slot}$, $(T_{gap2}-1)\leq\lfloor N_{slot}/2\rfloor$ is met, and $T_{gap1}=TRVI \% N_{slot}$ and $T_{gap2}=\lfloor TRVI/N_{slot}\rfloor+1$; and when $x\geq N_{slot}$, $(T_{gap2}-1)>\lfloor N_{slot}/2\rfloor$ is met, and $T_{gap1}=N_{slot}-TRVI \% N_{slot}-1$ and $T_{gap2}=N_{slot}-\lfloor TRVI/N_{slot}\rfloor+1$; or calculating a value x of $\lfloor(TRVI-W)/N_{slot}\rfloor+(TRVI-W) \% N_{slot}$, where when $x<N_{slot}$, $(T_{gap2}-1)\leq\lfloor N_{slot}/2\rfloor$ is met, and $T_{gap1}=(TRIV-W) \% N_{slot}$ and $T_{gap2}=\lfloor(TRVI-W)/N_{slot}\rfloor+1$; and when $x\geq N_{slot}$, $(T_{gap2}-1)>\lfloor N_{slot}/2\rfloor$ is met, and $T_{gap1}=N_{slot}-(TRIV-W) \% N_{slot}-1$ and $T_{gap2}=N_{slot}-\lfloor(TRVI-W)/N_{slot}\rfloor+1$.

The TRIV represents the value of the second field; the parameter W is a first time window, and the first time unit, the second time unit, or the third time unit is located in the first time window; and $N_{slot}$ is a maximum value of the first time domain interval or the second time domain interval, where $N_{slot}=W-2$, $0\leq T_{gap1}\leq N_{slot}-1$, and $1\leq T_{gap2}\leq N_{slot}$.

With reference to the second aspect and any possible implementation of the first aspect, in a seventh possible implementation of the second aspect, the control information further includes a third field, where when a value of the third field is a first value, a time unit of the first data channel is before a time unit of the second data channel and a time unit of the third data channel;

when the value of the third field is a second value, the time unit of the first data channel is between the time unit of the second data channel and the time unit of the third data channel; and when the value of the third field is a third value, the time unit of the first data channel is after the time unit of the second data channel and the time unit of the third data channel.

According to a third aspect, a communications apparatus is disclosed, including: a processing unit, configured to determine control information, where the control information includes a first field, and a value of the first field is used to indicate a quantity of first frequency domain units, a first start frequency domain unit index, and a second start frequency domain unit index; and the quantity of first frequency domain units is a quantity of frequency domain units included in a first data channel, a second data channel, or a third data channel, the first start frequency domain unit index is a start frequency domain unit index of the second data channel, and the second start frequency domain unit index is a start frequency domain unit index of the third data channel. A first terminal apparatus sends the control information and the first data channel to a second terminal apparatus in a first time unit.

With reference to the third aspect, in a first possible implementation of the third aspect, the processing unit is specifically configured to determine the value of the first field based on the first start frequency domain unit index, the second start frequency domain unit index, the quantity of first frequency domain units, and a quantity of frequency domain units included in a sidelink resource pool.

With reference to the third aspect, in a second possible implementation of the third aspect, the value of the first field is determined based on one or more of $(N-L+1)\times n^{start1}+n^{start2}$ $(N-L+1)$, $(L-2)$, $Y^2$, N, and $(N-L+1)\times n^{start1}$.

$n^{start1}$ is the start frequency domain unit index of the second data channel, $n^{start2}$ is the start frequency domain unit index of the third data channel, N is the quantity of frequency domain units included in the sidelink resource pool, L is the quantity of first frequency domain units, and Y is related to N and/or L.

With reference to the third aspect or any possible implementation of the third aspect, in a third possible implementation of the third aspect, the value of the first field meets the following:

when $(L-1)\leq\lfloor N/2\rfloor$ and L=1, $FRIV=(N-L+1)\times n^{start1}+n^{start2}$; and/or when $(L-1)\leq\lfloor N/2\rfloor$ and L>1, $FRIV=\Sigma_{i=0}^{L-2}(N-i)^2+\Sigma_{i=0}^{L-2}i^2+(N-L+1)\times n^{start1}+n^{start2}$; and/or when $(L-1)<\lfloor N/2\rfloor$, $FRIV=\Sigma_{i=0}^{N-L+1}(N-i)^2+\Sigma_{i=0}^{N-L+1}i^2$ $((N-L+1)\times n^{start1}+n^{start2})$.

The FRIV represents the value of the first field.

With reference to the third aspect or any possible implementation of the third aspect, in a fourth possible implementation of the third aspect, the control information further includes a second field, where a value of the second field is used to determine a second time unit carrying the second data channel and a third time unit carrying the third data channel.

With reference to the third aspect or any possible implementation of the third aspect, in a fifth possible implementation of the third aspect, the processing unit is further configured to determine the value of the second field based on a first time domain interval $T_{gap1}$ and a second time domain interval $T_{gap2}$.

The first data channel, the second data channel and the third data channel are located in different time units; and the first time domain interval $T_{gap1}$ is an interval between the first time unit and the second time unit, and the second time domain interval $T_{gap2}$ is an interval between the first time unit and the third time unit; or the first time domain interval $T_{gap1}$ is the interval between the first time unit and the second time unit, and the second time domain interval $T_{gap2}$ is an interval between the second time unit and the third time unit.

With reference to the third aspect or any possible implementation of the third aspect, in a sixth possible implementation of the third aspect, when $(T_{gap2}-1) \leq \lfloor N_{slot}/2 \rfloor$, $TRIV=N_{slot}*(T_{gap2}-1)+T_{gap1}+W$ or $TRIV=N_{slot}*(T_{gap2}-1)+T_{gap1}$; and when $(T_{gap2}-1) > \lfloor N_{slot}/2 \rfloor$, $TRIV=N_{slot}*(N_{slot}-T_{gap2}+1)+(N_{slot}-1-T_{gap1})+W$ or $TRIV=N_{slot}*(N_{slot}-T_{gap2}+1)+(N_{slot}-1-T_{gap1})$.

The TRIV represents the value of the second field; the parameter W is a first time window, and the first time unit, the second time unit, or the third time unit is located in the first time window; and $N_{slot}$ is a maximum value of the first time domain interval or the second time domain interval, where $N_{slot}=W-2$, $0 \leq T_{gap1} \leq N_{slot}-1$, and $1 \leq T_{gap2} \leq N_{slot}$.

With reference to the third aspect or any possible implementation of the third aspect, in a seventh possible implementation of the third aspect, the control information further includes a third field.

When the third field has a first value, a time unit of the first data channel is before a time unit of the second data channel and a time unit of the third data channel;

when the third field has a second value, the time unit of the first data channel is between the time unit of the second data channel and the time unit of the third data channel; and when the third field has a third value, the time unit of the first data channel is after the time unit of the second data channel and the time unit of the third data channel.

According to a fourth aspect, a communications apparatus is provided, including:

a communications unit, configured to receive, in a first time unit, control information and a first data channel that are sent by a first terminal apparatus, where the control information includes a first field; and a processing unit, configured to determine a quantity of first frequency domain units, a first start frequency domain unit index, and a second start frequency domain unit index based on a value of the first field, where the quantity of first frequency domain units is a quantity of frequency domain units included in the first data channel, a second data channel, or a third data channel, the first start frequency domain unit index is a start frequency domain unit index of the second data channel, and the second start frequency domain unit index is a start frequency domain unit index of the third data channel.

With reference to the fourth aspect, in a first possible implementation of the fourth aspect, the processing unit is specifically configured to:

calculate a value interval based on a parameter l; and
when the value FRIV of the first field belongs to the value interval, determine the quantity L of first frequency domain units based on N and the parameter l, and determine the first start frequency domain unit index $n^{start1}$ and the second start frequency domain unit index $n^{start2}$ based on the FRIV, the quantity L of first frequency domain units, and N; and when the FRIV does not belong to the value interval, update the parameter l to (l+1), until the FRIV belongs to a value interval corresponding to an updated parameter l.

The parameter $$l = 1, \ldots, \left\lfloor \frac{N}{2} \right\rfloor + 1,$$

and N is a quantity of frequency domain units included in a sidelink resource pool.

With reference to the fourth aspect or any possible implementation of the fourth aspect, in a second possible implementation of the fourth aspect, a start value of the value interval is $f_l^s$, and an end value of the value interval is $f_l^e$.

When the parameter l=1, the start value $f_l^s=0$, and the end value $f_l^e=\Sigma_{i=0}^{l+1-2}(N-i)^2+\Sigma_{i=0}^{l+1-2}i^2-1$;

When the parameter $$l = 2, \ldots, \left\lfloor \frac{N}{2} \right\rfloor,$$

the start value $f_l^s=\Sigma_{i=0}^{l-2}(N-i)^2+\Sigma_{i=0}^{l+1-2}i^2$, and the end value $f_l^e=\Sigma_{i=0}^{l+1-2}(N-i)^2+\Sigma_{i=0}^{l+1-2}i^2-1$.

When the parameter $$l = \left\lfloor \frac{N}{2} \right\rfloor + 1,$$

the start value $f_l^s=\Sigma_{i=0}^{t-2}(N-i)^2+\Sigma_{i=0}^{t-2}i^2$, and the end value $$f_l^e = N*(N+1)*\frac{(2*N+1)}{6} - 1.$$

With reference to the fourth aspect or any possible implementation of the fourth aspect, in a third possible implementation of the fourth aspect, if the FRIV is less than or equal to $f_l^s+(N-(l-1))^2-1$, L=l, $n^{start1}=\lfloor (FRIV-f_l^s)/(N-L+1) \rfloor$, and $n^{start2}=(FRIV-f_l^s)-n^{start1}*(N-L+1)$; and if the FRIV is greater than $f_l^s+(N-(l-1))^2-1$, L=N-l+2, $n^{start1}=\lfloor (f_l^e-FRIV)/(N-L+1) \rfloor$, and $n^{start2}=(f_l^e-FRIV)-n^{start1}*(N-L+1)$.

With reference to the fourth aspect or any possible implementation of the fourth aspect, in a fourth possible implementation of the fourth aspect, the control information further includes a second field, where a value of the second field is used to determine a second time unit carrying the second data channel and a third time unit carrying the third data channel.

With reference to the fourth aspect or any possible implementation of the fourth aspect, in a fifth possible implementation of the fourth aspect, the processing unit is further configured to:

determine a first time domain interval $T_{gap1}$ and a second time domain interval $T_{gap2}$ based on the value of the second field, where the first data channel, the second data channel, and the third data channel are located in different time units; and the first time domain interval $T_{gap1}$ is an interval between the first time unit and the second time unit, and the second time domain interval $T_{gap2}$ is an interval between the first time unit and the third time unit; or the first time domain interval $T_{gap1}$ is the interval between the first time unit and the second time unit, and the second time domain interval $T_{gap2}$ is an interval between the second time unit and the third time unit.

With reference to the fourth aspect or any possible implementation of the fourth aspect, in a sixth possible implementation of the fourth aspect, the processing unit is specifically configured to:

calculate a value x of $\lfloor TRVI/N_{slot} \rfloor + TRVI \% N_{slot}$, where when $x < N_{slot}$, $(T_{gap2}-1) \leq \lfloor N_{slot}/2 \rfloor$ is met, and $T_{gap1} = TRVI \% N_{slot}$ and $T_{gap2} = \lfloor TRVI/N_{slot} \rfloor + 1$; and when $x \geq N_{slot}$, $(T_{gap2}-1) > \lfloor N_{slot}/2 \rfloor$ is met, and $T_{gap1} = N_{slot} - TRVI \% N_{slot} - 1$ and $T_{gap2} = N_{slot} - \lfloor TRVI/N_{slot} \rfloor + 1$; or calculate a value x of $\lfloor (TRVI-W)/N_{slot} \rfloor + (TRVI-W) \% N_{slot}$, where when $x < N_{slot}$, $(T_{gap2}-1) \leq \lfloor N_{slot}/2 \rfloor$ is met, and $T_{gap1} = (TRVI-W) \% N_{slot}$ and $T_{gap2} = \lfloor (TRVI-W)/N_{slot} \rfloor + 1$; and when $x \geq N_{slot}$, $(T_{gap2}-1) > \lfloor N_{slot}/2 \rfloor$ is met, and $T_{gap1} = N_{slot} - (TRVI-W) \% N_{slot} - 1$ and $T_{gap2} = N_{slot} - \lfloor (TRVI-W)/N_{slot} \rfloor + 1$.

The TRVI represents the value of the second field; the parameter W is a first time window, and the first time unit, the second time unit, or the third time unit is located in the first time window; and $N_{slot}$ is a maximum value of the first time domain interval or the second time domain interval, where $N_{slot} = W-2$, $0 \leq T_{gap1} \leq N_{slot}-1$, and $1 \leq T_{gap2} \leq N_{slot}$.

With reference to the fourth aspect or any possible implementation of the fourth aspect, in a seventh possible implementation of the fourth aspect, the control information further includes a third field, where when a value of the third field is a first value, a time unit of the first data channel is before a time unit of the second data channel and a time unit of the third data channel;

when the value of the third field is a second value, the time unit of the first data channel is between the time unit of the second data channel and the time unit of the third data channel; and when the value of the third field is a third value, the time unit of the first data channel is after the time unit of the second data channel and the time unit of the third data channel.

According to a fifth aspect, a communications apparatus is provided, including at least one processor and a memory. The at least one processor is coupled to the memory, and the memory is configured to store a computer program.

The at least one processor is configured to execute the computer program stored in the memory, so that the apparatus performs the method according to the first aspect and any implementation of the first aspect, or the method according to the second aspect and any implementation of the second aspect.

According to a sixth aspect, a computer-readable storage medium is provided. The computer-readable storage medium stores instructions, and when the computer-readable storage medium is run on the communications apparatus according to the third aspect and any implementation of the third aspect, the communications apparatus is enabled to perform the communications method according to the first aspect and any implementation of the first aspect.

According to a seventh aspect, a computer-readable storage medium is provided. The computer-readable storage medium stores instructions, and when the computer-readable storage medium is run on the communications apparatus according to the fourth aspect and any implementation of the fourth aspect, the communications apparatus is enabled to perform the communications method according to the second aspect and any implementation of the second aspect.

According to an eighth aspect, a wireless communications apparatus is provided. The communications apparatus includes a processor. For example, the processor is applied to the communications apparatus to implement the method according to the first aspect and any implementation of the first aspect. The communications apparatus may be, for example, a chip system. In a feasible implementation, the chip system further includes a memory, and the memory is configured to store program instructions and data that are necessary for implementing functions of the method according to the first aspect.

According to a ninth aspect, a wireless communications apparatus is provided. The communications apparatus includes a processor. For example, the processor is applied to the communications apparatus to implement the function or the method according to the second aspect and any implementation of the second aspect. The communications apparatus may be, for example, a chip system. In a feasible implementation, the chip system further includes a memory, and the memory is configured to store program instructions and data that are necessary for implementing functions of the method according to the second aspect.

The chip system in the foregoing aspect may be a system on chip (SOC), or may be a baseband chip or the like. The baseband chip may include a processor, a channel encoder, a digital signal processor, a modem, an interface module, and the like.

DESCRIPTION OF EMBODIMENTS

Figure 1:
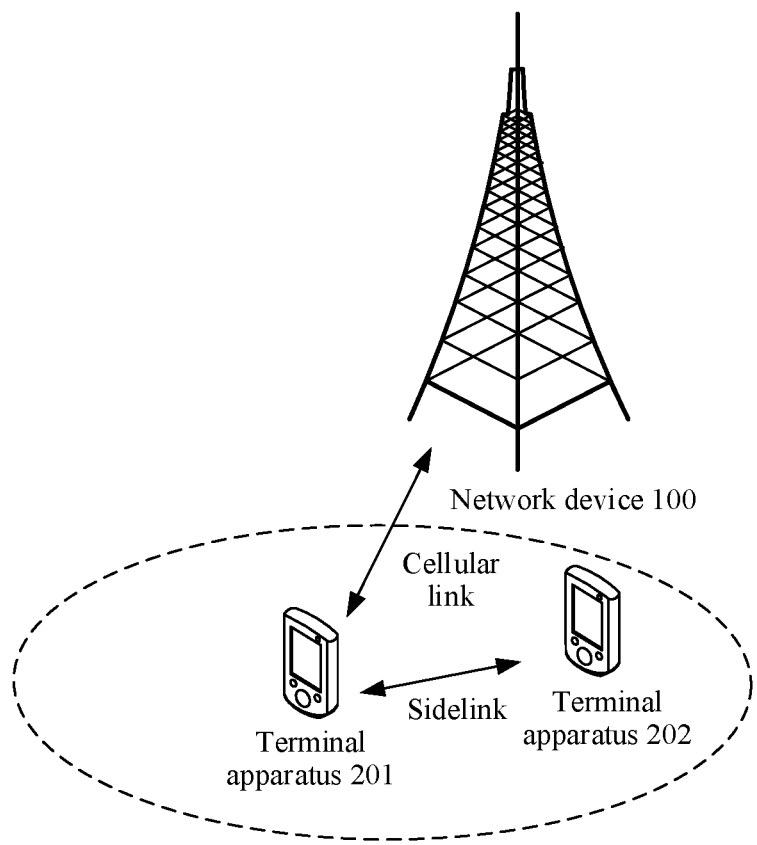
FIG. 1 is a diagram of an architecture of a communications system according to an embodiment of this application.

FIG. 1 is a schematic diagram of a communications system to which the technical solutions provided in this application is applicable. The communications system may include a plurality of network devices (only a network device 100 is shown) and a plurality of terminal apparatuses (only a terminal apparatus 201 and a terminal apparatus 202 are shown in the figure). FIG. 1 is merely the schematic diagram and constitutes no limitation on an applicable scenario of the technical solutions provided in this application.

The network device 100 may be any device with a wireless receiving/transmission function, and includes but is not limited to an evolved NodeB (E-UTRAN NodeB or e-NodeB or eNB) in LTE, a gNodeB (gNodeB or gNB) or a transmission/reception point (transmission/reception point, TRP) in a 5G or new radio (NR) access technology, a subsequent evolved base station in 3GPP, and an access node, a wireless relay node, a wireless backhaul node, or the like in a Wi-Fi system. The base station may be a macro base station, a micro base station, a picocell base station, a small cell, a relay station, a balloon station, or the like. A plurality of base stations may support networks of a same technology mentioned above, or may support networks of different technologies mentioned above. The base station may include one or more co-site or non-co-site TRPs. The network device may be a radio controller, a centralized unit (CU), and/or a distributed unit (DU) in a cloud radio access network (CRAN) scenario. The network device may be a server, a wearable device, an in-vehicle device, or the like. An example in which the network device is a base station is used below for description. The plurality of network devices may be base stations of a same type or may be base stations of different types. The base station may communicate with the terminal apparatus, or may communicate with the terminal apparatus by using a relay station. The terminal apparatus may communicate with a plurality of base stations of different technologies. For example, the terminal apparatus may communicate with a base station supporting an LTE network, may communicate with a base station supporting a 5G network, and may support dual connection to the base station in the LTE network and the base station in the 5G network.

The terminal apparatus (e.g., a terminal apparatus 200) is a device with a wireless receiving/transmission function, and may be deployed on land including indoor or outdoor, handheld, wearable, or in-vehicle; or may be deployed on a water surface (e.g., on a ship); or may be deployed in the air (e.g., on an airplane, a balloon, and a satellite). The terminal apparatus may be a mobile phone, a tablet computer (Pad), a computer with a wireless receiving/transmission function, a virtual reality (VR) terminal apparatus, an augmented reality (AR) terminal apparatus, a wireless terminal in industrial control, an in-vehicle terminal apparatus, a wireless terminal in self-driving, a wireless terminal in remote medical, a wireless terminal in a smart grid, a wireless terminal in transportation safety, a wireless terminal in a smart city, a wireless terminal in a smart home, a wearable terminal apparatus, or the like. An application scenario is not limited in embodiments of this application. A terminal sometimes may also be referred to as a terminal apparatus, user equipment (UE), an access terminal apparatus, an in-vehicle terminal, an industrial control terminal, a UE unit, a UE station, a mobile station, a mobile console, a remote station, a remote terminal apparatus, a mobile device, a UE terminal apparatus, a terminal apparatus, a wireless communications device, a UE agent, a UE apparatus, or the like. The terminal may also be fixed or mobile. The terminal apparatus in this application may also be built in an in-vehicle module, an in-vehicle module, an in-vehicle component, an in-vehicle chip, or an in-vehicle unit of a vehicle as one or more components. The vehicle may implement the method in this application by using the built in-vehicle module, in-vehicle module, in-vehicle component, in-vehicle chip, or in-vehicle unit.

The network device communicates with the terminal apparatus (e.g., the terminal apparatus 202 or the terminal apparatus 201) through a Uu link, and terminal apparatuses (e.g., the terminal apparatus 201 and the terminal apparatus 202) communicate with each other through a sidelink.

Terms in the embodiments of this application are first explained.

(1) Subchannel

A sidelink resource pool includes several subchannels, and each subchannel includes several consecutive physical resource blocks (physical resource block, PRB). A quantity N of subchannels included in the sidelink resource pool and a quantity of PRBs included in the subchannel are determined by a higher-layer parameter.

(2) PSSCH

The PSSCH is a data channel on a sidelink, and data may be transmitted between terminal apparatuses through the PSSCH. A frequency domain resource of the PSSCH includes one or more consecutive frequency domain units, for example, including L consecutive subchannels, where L is an integer greater than or equal to 1. In the embodiments of this application, that the PSSCH includes L consecutive frequency domain units may be understood as that the PSSCH occupies L consecutive frequency domain units or that L consecutive frequency domain units are allocated to the PSSCH. The terminal apparatus may transmit data by using the L consecutive frequency domain units allocated to the PSSCH. The consecutive frequency domain units may be consecutive frequency domain units in the sidelink resource pool. The frequency domain unit may be a PRB, may be a subchannel, or may be another unit in frequency domain. This is not limited in the embodiments of this application.

The frequency domain resource of the PSSCH is determined by a start frequency domain unit and a quantity L of frequency domain units that are of the PSSCH. The start frequency domain unit of the PSSCH may be a first frequency domain unit included in the PSSCH, and the first frequency domain unit is a frequency domain unit with a lowest index in frequency domain units allocated to the PSSCH. The quantity L of frequency domain units is represented as the L consecutive frequency domain units allocated to the PSSCH.

Figure 2:
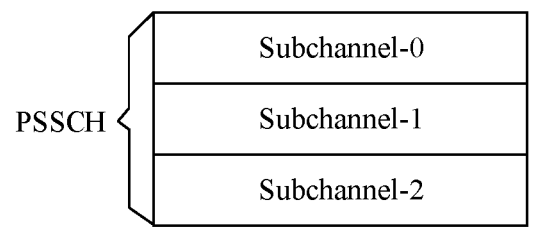
FIG. 2 is a schematic diagram of a data channel according to an embodiment of this application.

For example, a subchannel is used as an example. With reference to FIG. 2, the PSSCH includes three consecutive subchannels, which are respectively a subchannel-0, a subchannel-1, and a subchannel-2. In ascending order of indexes of the subchannel-0, the subchannel-1, and the subchannel-2, the index of the subchannel-0 is lowest, and the subchannel-0 is the start frequency domain unit (which may be referred to herein as a start subchannel) of the PSSCH. The quantity L of frequency domain units of the PSSCH is equal to 3, that is, the PSSCH includes L consecutive subchannels.

In LTE-V2X, SCI can indicate frequency domain resources of a maximum of two PSSCHs, for example, a PSSCH 1 and a PSSCH 2. That the frequency domain unit is a subchannel is used as an example. A start subchannel of the PSSCH 1 is a start subchannel of a frequency domain resource of the SCI, and a start subchannel of the PSSCH 2 is determined by a start subchannel index $n_{subCH}^{start}$ indicated by the SCI. The SCI may further indicate a quantity $L_{subCH}$ (a type of the quantity L of frequency domain units) of subchannels. A frequency domain resource of the PSSCH 1 may be determined based on $L_{subCH}$ and the start subchannel of the PSSCH 1, and a frequency domain resource of the PSSCH 2 may be determined based on the start subchannel of the PSSCH 2 and L. $L_{subCH}$ represents a quantity of consecutive subchannels included in the PSSCH 1 or the PSSCH 2, and the consecutive subchannels indicate consecutive subchannels in the sidelink resource pool.

It should be noted that the frequency domain resource of the SCI may be a frequency domain resource on which the terminal apparatus sends or receives the SCI. The subchannel index $n_{subCH}^{start}$ represents a subchannel, which may be the first subchannel included in the PSSCH. It may be understood that $1 \leq L_{subCH} \leq N_{subCH}$ and $0 \leq n_{subCH}^{start} \leq N_{subCH} - L_{subCH}$, where $N_{subCH}$ is a total quantity of subchannels included in the sidelink resource pool. When the quantity $L_{subCH}$ of subchannels included in the PSSCH is determined, the sidelink resource pool has $(N_{subCH}-L+1)$ possible PSSCH resources in total, which correspond to $(N_{subCH}-L+1)$ start subchannel indexes $n_{subCH}^{start}$.

Figure 3:
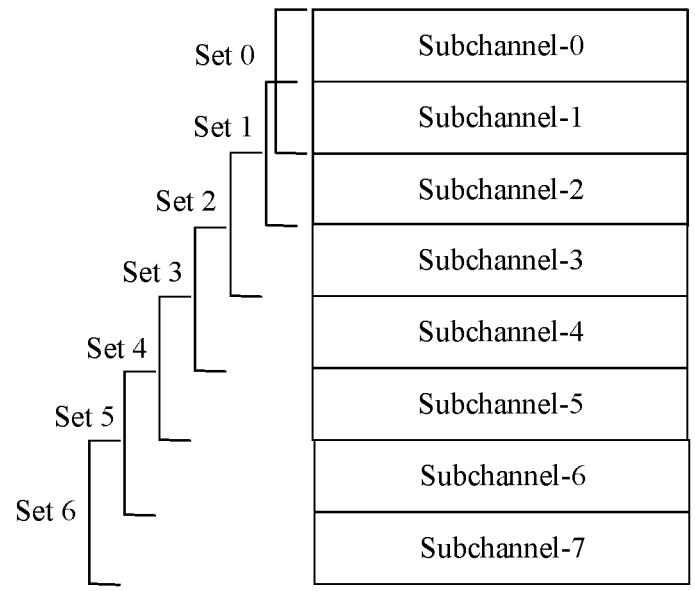
FIG. 3 is another schematic diagram of a data channel according to an embodiment of this application.

For example, referring to FIG. 3, assuming that $N_{subCH}=8$ and $L_{subCH}=2$ there are $N_{subCH}-L_{subCH}+1=7$ possible PSSCH resources in total, which are respectively a set 0 to a set 6 in FIG. 3. Start subchannel indexes $n_{subCH}^{start}$ in the set 0 to set 6 are respectively 0 to 6. "0" represents the subchannel-0, "1" represents the subchannel-1, and so on. For example, the start frequency domain unit in the set 0 is the subchannel-0, and the set 0 includes two consecutive subchannels: the subchannel-0 and the subchannel-1. The start frequency domain unit in the set 1 is the subchannel-1, and the set 1 includes two consecutive subchannels: the subchannel-1 and a subchannel-2.

A time domain resource of the PSSCH includes one or more time units. In the embodiments of this application, that the time domain resource of the PSSCH includes one or more time units may be understood as that the PSSCH occupies one or more time units or that one or more time units are allocated to the PSSCH. The terminal apparatus may transmit data by using the one or more time units allocated to the PSSCH.

The time unit may be a slot, a symbol, or a mini-slot, or may be another unit in time domain. This is not limited in the embodiments of this application.

In LTE-V2X, the SCI can indicate time units of a maximum of two PSSCHs. The time unit of one PSSCH is a time unit in which the terminal apparatus sends or receives the SCI, and the time unit of the other PSSCH is determined by a time domain interval indicated by the SCI and a time unit of the SCI.

Figure 4:
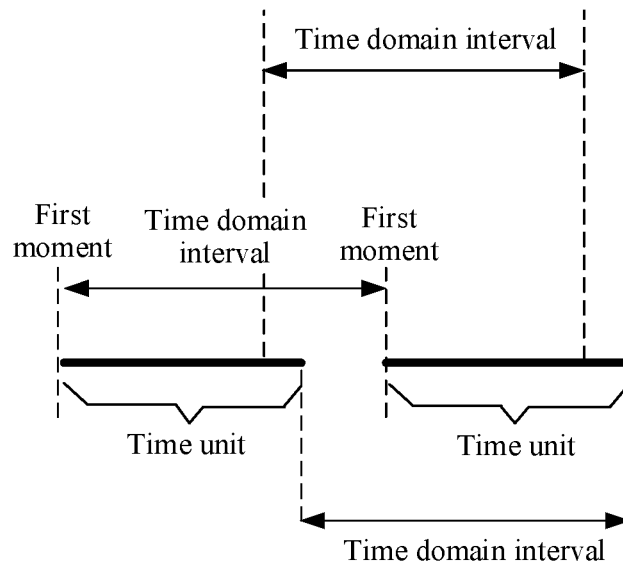
FIG. 4 is a schematic diagram of a time domain interval according to an embodiment of this application.

In the embodiments of this application, a time domain interval between two time units indicates an interval between first moments of the two time units. A unit of the time domain interval may be a time unit, that is, the time domain interval may include one or more time units. For example, referring to FIG. 4, the first moment may be a start moment of the time unit, an end moment of the time unit, an intermediate moment of the time unit, or any moment of the time unit. For example, a first time unit is a slot 0, a second time unit is a slot 2, and a time domain interval between the second time unit and the second time unit is two slots.

(3) Physical Sidelink Control Channel (PSCCH)

The PSCCH is a control channel on a sidelink, and SCI may be transmitted between terminal apparatuses through the PSCCH to schedule data transmission on the sidelink.

The embodiments of this application provide a communications method. A first terminal apparatus determines control information. The control information includes a first field, and a value of the first field is used to determine a quantity of first frequency domain units, a first start frequency domain unit index, and a second start frequency domain unit index. The quantity of first frequency domain units is a quantity of frequency domain units included in a first data channel, a second data channel, or a third data channel, the first start frequency domain unit index is a start frequency domain unit index of the second data channel, and the second start frequency domain unit index is a start frequency domain unit index of the third data channel. The first terminal apparatus sends the control information and the first data channel to a second terminal apparatus in a first time unit. It may be learned that the control information (e.g., SCI) in the embodiments of this application can indicate three data channels (e.g., PSSCHs), which supports a scenario in which a higher-layer parameter $N_{MAX}$ is 3, and meets a requirement of NR-V2X.

Figure 5A:
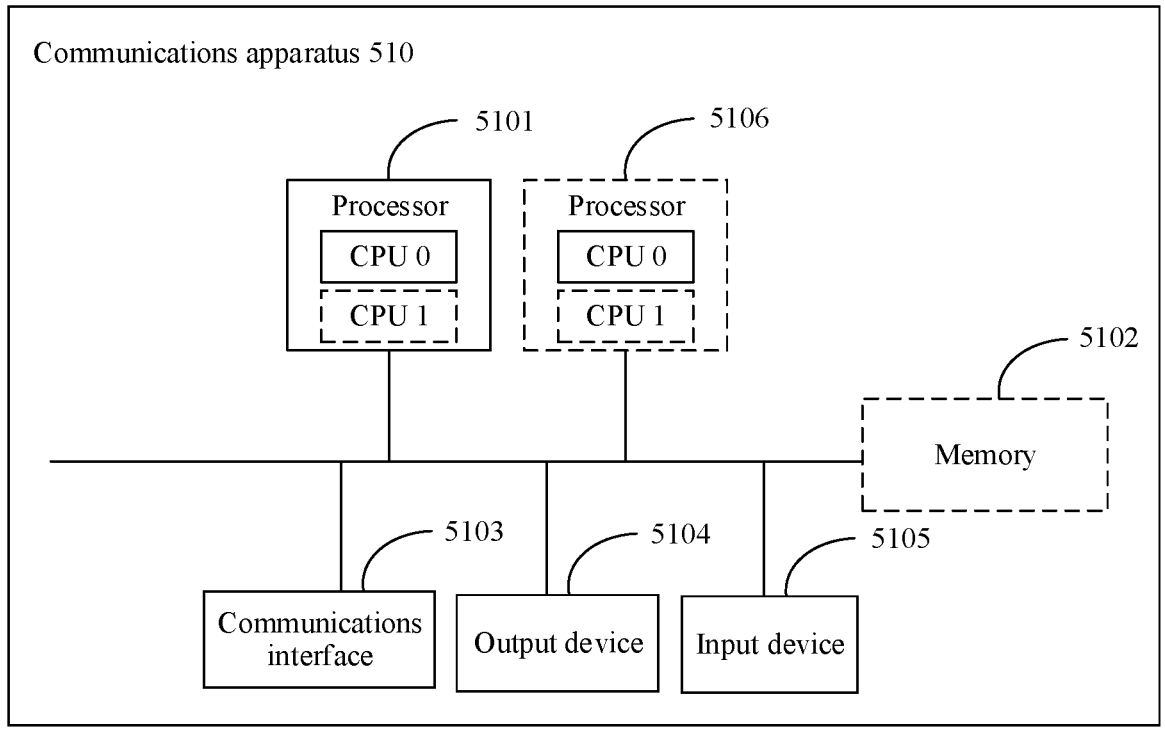
FIG. 5a is a block diagram of a structure of a communications apparatus according to an embodiment of this application.

The terminal apparatus in embodiments of this application may be implemented by using a communications apparatus 510 in FIG. 5a. FIG. 5a is a schematic diagram of a hardware structure of the communications apparatus 510 according to an embodiment of this application. The communications apparatus 510 includes a processor 5101, a memory 5102, and at least one communications interface (where in FIG. 5a, that a communications interface 5103 is included is merely used as an example for description). The processor 5101, the memory 5102, and the communications interface 5103 are connected to each other. Optionally, the communications apparatus 510 may not include the memory 5102.

The processor 5101 may be a general-purpose central processing unit (CPU), a microprocessor, an application-specific integrated circuit (ASIC), or one or more integrated circuits configured to control program execution of the solutions of this application.

The communications interface 5103 is any apparatus such as a transceiver, and is configured to communicate with another device or a communications network such as the Ethernet, a radio access network (RAN), or a wireless local area network (WLAN).

The memory 5102 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or other compact disc storage, optical disc storage (including a compact disc, a laser disc, an optical disc, a digital versatile disc, a Blu-ray disc, and the like), a magnetic disk storage medium or another magnetic storage device, or any other medium that can be used to carry or store expected program code in an instruction form or a data structure form and that can be accessed by a computer. However, the memory 5102 is not limited thereto. The memory may exist independently, or may be connected to the processor. Alternatively, the memory may be integrated with the processor.

The memory 5102 is configured to store computer-executable instructions for performing the solutions of this application, and the processor 5101 controls execution of the computer-executable instructions. The processor 5101 is configured to execute the computer-executable instructions stored in the memory 5102, to implement the intent processing method provided in the following embodiment of this application.

Optionally, the computer-executable instructions in embodiments of this application may also be referred to as application program code. This is not specifically limited in embodiments of this application.

During specific implementation, in an embodiment, the processor 5101 may include one or more CPUs such as a CPU 0 and a CPU 1 in FIG. 5*a*.

During specific implementation, in an embodiment, the communications apparatus 510 may include a plurality of processors, for example, the processor 5101 and a processor 5106 in FIG. 5*a*. Each of the processors may be a single-core (single-CPU) processor or a multi-core (multi-CPU) processor. The processor herein may be one or more devices, circuits, and/or processing cores configured to process data (e.g., computer program instructions).

During specific implementation, in an embodiment, the communications apparatus 510 may further include an output device 5104 and an input device 5105. The output device 5104 communicates with the processor 5101, and may display information in a plurality of manners. For example, the output device 5104 may be a liquid crystal display (LCD), a light emitting diode (LED) display device, a cathode ray tube (CRT) display device, or a projector. The input device 5105 communicates with the processor 5101, and may receive an input of a user in a plurality of manners. For example, the input device 5105 may be a mouse, a keyboard, a touchscreen device, or a sensing device.

The communications apparatus 510 may be a general-purpose device or a dedicated device. During specific implementation, the communications apparatus 510 may be a desktop computer, a portable computer, a network server, a palmtop computer (PDA), a mobile phone, a tablet computer, a wireless terminal apparatus, an embedded device, or a device having a structure similar to that in FIG. 5*a*. A type of the communications apparatus 510 is not limited in embodiments of this application.

It should be noted that the communications apparatus 510 may be an entire terminal, may be a part or component that implements a function of the terminal, or may be a communications chip, for example, a baseband chip. When the communications apparatus 510 is the entire terminal, the communications interface may be a radio frequency module. When the communications apparatus 510 is the communications chip, the communications interface 5103 may be an input/output interface circuit of the chip, where the input/output interface circuit is configured to read and output baseband signals.

Figure 5B:
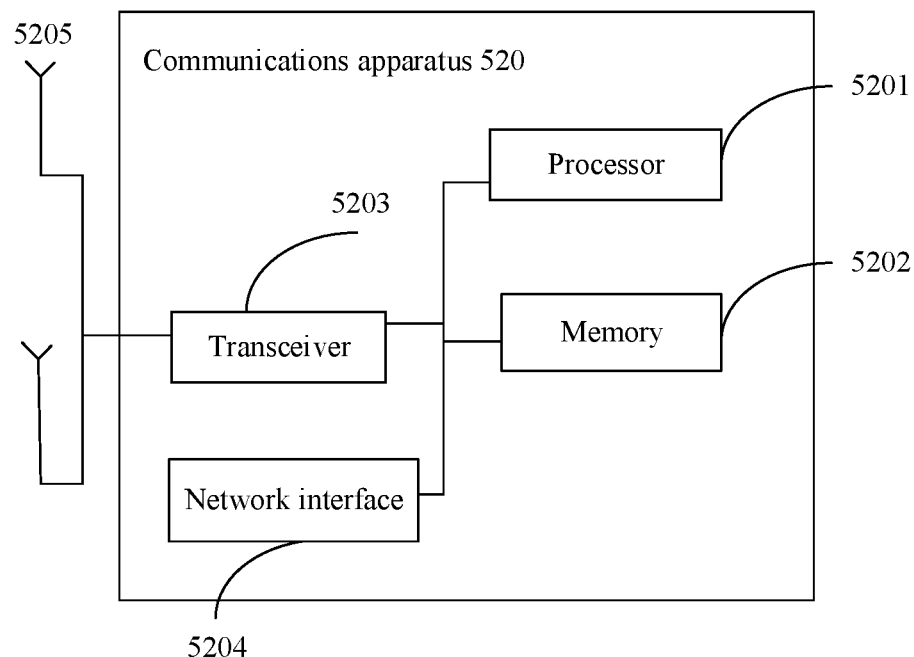
FIG. 5b is a block diagram of another structure of a communications apparatus according to an embodiment of this application.

FIG. 5*b* is a schematic diagram of a structure of a network device. For the structure of the network device 520, refer to the structure shown in FIG. 5*b*.

The network device includes at least one processor 5201, at least one memory 5202, at least one transceiver 5203, at least one network interface 5204, and one or more antennas 5205. The processor 5201, the memory 5202, the transceiver 5203, and the network interface 5204 are connected, for example, through a bus. The antenna 5205 is connected to the transceiver 5203. The network interface 5204 is configured to connect the network device to another communications device by using a communications link. For example, the network device is connected to a core network element through an S1 interface. In embodiments of this application, the connection may include various types of interfaces, transmission lines, buses, or the like. This is not limited in embodiments. Optionally, the network device 520 may not include the memory 5202.

A processor, for example, the processor 5201 in embodiments of this application may include at least one of the following types: a general-purpose central processing unit (CPU), a digital signal processor (DSP), a microprocessor, an application-specific integrated circuit (ASIC), a microcontroller unit (MCU), a field programmable gate array (FPGA), or an integrated circuit configured to implement a logical operation. For example, the processor 5201 may be a single-core (single-CPU) processor or a multi-core (multi-CPU) processor. The at least one processor 5201 may be integrated into one chip or located on a plurality of different chips.

A memory, for example, the memory 5202 in embodiments of this application may include at least one of the following types: a read-only memory (ROM) or another type of static storage device that can store static information and instructions, or a random access memory (RAM) or another type of dynamic storage device that can store information and instructions, or may be an electrically erasable programmable read-only memory (EEPROM). In some scenarios, the memory may alternatively be a compact disc read-only memory (CD-ROM) or other compact disc storage, optical disc storage (including a compact disc, a laser disc, an optical disc, a digital versatile disc, a Blu-ray disc, and the like), a magnetic disk storage medium or another magnetic storage device, or any other medium that can be used to carry or store expected program code in an instruction form or a data structure form and that can be accessed by a computer. However, the memory is not limited thereto.

The memory 5202 may exist independently, and is connected to the processor 5201. Optionally, the memory 5202 may alternatively be integrated with the processor 5201, for example, integrated into a chip. The memory 5202 can store program code for performing the technical solutions in embodiments of this application, and the processor 5201 controls execution of the program code. Various types of executed computer program code may also be considered as drivers of the processor 5201. For example, the processor 5201 is configured to execute the computer program code stored in the memory 5202, to implement the technical solutions in embodiments of this application.

The transceiver 5203 may be configured to support receiving or sending of a radio frequency signal between the network device and a terminal apparatus, and the transceiver 5203 may be connected to the antenna 5205. Specifically, the one or more antennas 5205 may receive a radio frequency signal. The transceiver 5203 may be configured to: receive the radio frequency signal from the antenna, convert the radio frequency signal into a digital baseband signal or a digital intermediate frequency signal, and provide the digital baseband signal or the digital intermediate frequency signal for the processor 5201, so that the processor 5201 further processes the digital baseband signal or the digital intermediate frequency signal, for example, performs demodulation processing and decoding processing. In addition, the transceiver 5203 may be configured to: receive a modulated digital baseband signal or digital intermediate frequency signal from the processor 5201, convert the modulated digital baseband signal or digital intermediate frequency signal into a radio frequency signal, and send the radio frequency signal through the one or more antennas 5205. Specifically, the transceiver 5203 may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transceiver 5203 may selectively perform one or more levels of frequency up-mixing processing and digital-to-analog conversion processing on the modulated digital baseband signal or digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as digital signals. The transceiver may be referred to as a transceiver circuit, a transceiver unit, a transceiver component, a sending circuit, a sending unit, a sending component, or the like.

It should be noted that the communications apparatus 520 may be an entire network device, may be a part or component that implements a function of the network device, or may be a communications chip. When the communications apparatus 520 is the communications chip, the transceiver 5203 may be an interface circuit of the chip, and the interface circuit is configured to read and output baseband signals.

Figure 6:
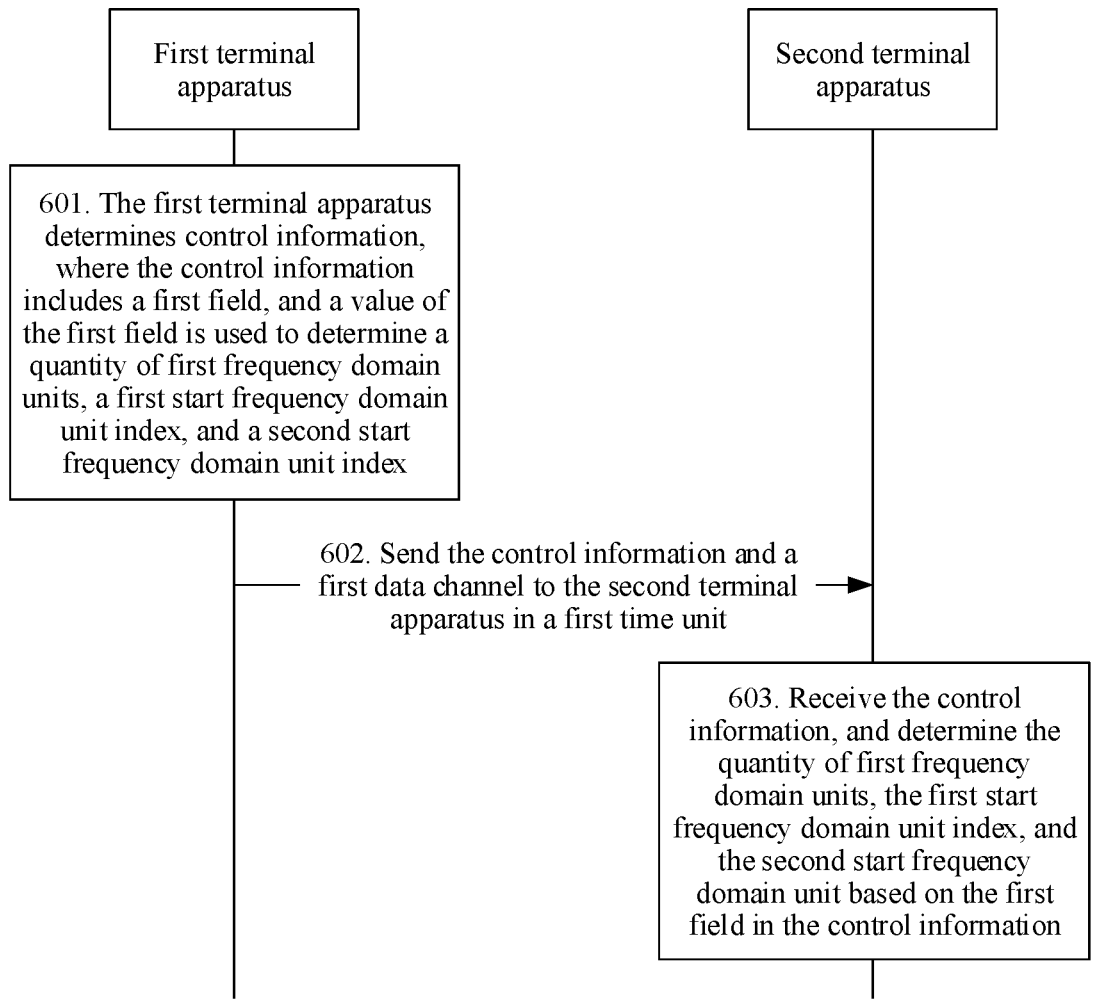
FIG. 6 is a schematic flowchart of a communications method according to an embodiment of this application.

An embodiment of this application provides a communications method. As shown in FIG. 6, the method includes the following steps.

601. A first terminal apparatus determines control information, where the control information includes a first field, and a value of the first field is used to determine a quantity of first frequency domain units, a first start frequency domain unit index, and a second start frequency domain unit index.

The quantity of first frequency domain units is a quantity of frequency domain units included in a first data channel, a second data channel, or a third data channel, the first start frequency domain unit index is a start frequency domain unit index of the second data channel, and the second start frequency domain unit index is a start frequency domain unit index of the third data channel. The first data channel, the second data channel, and the third data channel are located in different time units. In this embodiment of this application, the start frequency domain unit index is used to determine a start frequency domain unit of a data channel, that is, the first frequency domain unit included in the data channel.

The first data channel, the second data channel, and the third data channel may be physical sidelink data channels (PSSCHs). The control information may be sidelink control information (SCI), which is carried on a physical sidelink control channel (PSCCH).

In specific implementation, the control information can indicate frequency domain resources of a maximum of three data channels. Specifically, the first terminal apparatus may determine the first field based on a start frequency domain unit of a data channel and a quantity L of frequency domain units, and indicate a frequency domain resource of the data channel by using the first field in the control information.

In a possible implementation, the value of the first field is determined based on one or more of $(N-L+1) \times n^{start1} + n^{start2}$, $(N-L+1)$, $(L-2)$, $Y^2$, $N$, and $(N-L+1) \times n^{start1}$.

$n^{start1}$ is the start frequency domain unit index of the second data channel, $n^{start2}$ is the start frequency domain unit index of the third data channel, N is a quantity of frequency domain units included in a sidelink resource pool, L is the quantity of first frequency domain units, and Y is related to N and/or L.

In a possible implementation, the value of the first field may be represented by a frequency resource indication value (FRIV), and the value of the first field is determined based on $(N-L+1) \times n^{start1} + n^{start2}$. N is the quantity of frequency domain units included in the sidelink resource pool; $n^{start1}$ is the first start frequency domain unit index in this embodiment of this application, and may indicate a frequency domain unit; and $n^{start2}$ is the second start frequency domain unit index in this embodiment of this application, and may indicate a frequency domain unit.

For example, when $(L-1) \leq \lfloor N/2 \rfloor$ and L=1, the FRIV meets the following formula (1):

$$\text{FRIV} = (N-L+1) \times n^{start1} + n^{start2} \qquad (1)$$

When $(L-1) \leq \lfloor N/2 \rfloor$ and L>1, the FRIV meets the following formula (2):

$$\text{FRIV} = \Sigma_{i=0}^{L-2}(N-i)^2 + \Sigma_{i=0}^{L-2}i^2 + (N-L+1) \times n^{start1} + n^{start2} \qquad (2)$$

When $(L-1) \geq \lfloor N/2 \rfloor$, the FRIV meets the following formula (3):

$$\text{FRIV} = \Sigma_{i=0}^{N-L+1}(N-i)^2 + \Sigma_{i=0}^{N-L+1}i^2 - 1 - ((N-L+1) \times n^{start1} + n^{start2}) \qquad (3)$$

It should be noted that "$\lfloor \ \rfloor$" in this embodiment of this application is a rounding down operation.

When the first terminal apparatus sends the first data channel, for example, the first data channel in this embodiment of this application, a start frequency domain unit of the first data channel is a start frequency domain unit m of a frequency domain resource on which the first terminal apparatus sends the control information, and a quantity of frequency domain units of the first data channel is L. Letting $n^{start1} = n^{start2} = m$, $n^{start1}$, $n^{start2}$, and L are substituted into the foregoing formula (1) or formula (2) or formula (3) to determine the value of the first field.

When the first terminal apparatus sends two data channels, for example, the first data channel and the second data channel in this embodiment of this application, the start frequency domain unit of the first data channel is the start frequency domain unit m of the frequency domain resource on which the first terminal apparatus sends the control information, a start frequency domain unit of the second data channel is a frequency domain unit corresponding to the first start frequency domain unit index $n^{start1}$ and a quantity of frequency domain units of the first data channel and the second data channel is L. Letting $n^{start1} = n^{start2}$, $n^{start1}$, $n^{start2}$, and L are substituted into the foregoing formula (1) or formula (2) or formula (3) to determine the value of the first field.

When the first terminal apparatus sends three data channels, for example, the first data channel, the second data channel, and the third data channel in this embodiment of this application, the start frequency domain unit of the first data channel is the start frequency domain unit m of the frequency domain resource on which the first terminal apparatus sends the control information, the start frequency domain unit of the second data channel is the frequency domain unit corresponding to the first start frequency domain unit index $n^{start1}$, a start frequency domain unit of the third data channel is a frequency domain unit corresponding to the second start frequency domain unit index $n^{start2}$, and a quantity of frequency domain units of the first data channel, the second data channel, and the third data channel is L. $n^{start1}$, $n^{start2}$ and L are substituted into the foregoing formula (1) or formula (2) or formula (3) to determine the value of the first field.

For example, the first terminal apparatus sends three data channels, and a quantity of frequency domain units of the data channel is L=1, and the quantity of frequency domain units included in the sidelink resource pool is N=5, which meets $(L-1) \leq \lfloor N/2 \rfloor$ and L=1. Assuming that the first start frequency domain unit index $n^{start1} = 0$ and the second start frequency domain unit index $n^{start2} = 1$, the two indexes are substituted into the formula (1) to determine that the value of the first field is 1.

In a possible implementation, the first field is a binary number of the FRIV. Assuming that the FRIV has P possible values in total, the first field is a binary number with a length of $\lceil \log_2 P \rceil$.

TABLE 1

| 0  | 1  | 2  | 3  | 4  | 5  | 6  | 7  | 8  | 9  | 10 | 11 | 12 | 13 | 14 | 15 | 16 | 17 | 18 | 19 | 20 | 21 | 22 | 23 | 24 |
|----|----|----|----|----|----|----|----|----|----|----|----|----|----|----|----|----|----|----|----|----|----|----|----|----|
| 25 | 26 | 27 | 28 | 29 | 30 | 31 | 32 | 33 | 34 | 35 | 36 | 37 | 38 | 39 | 40 |    |    |    |    |    |    |    |    |    |
| 42 | 43 | 44 | 45 | 46 | 47 | 48 | 49 | 50 |    |    |    |    |    |    |    |    |    |    |    |    |    |    |    |    |
| 54 | 53 | 52 | 51 |    |    |    |    |    |    |    |    |    |    |    |    |    |    |    |    |    |    |    |    |    |
| 41 |    |    |    |    |    |    |    |    |    |    |    |    |    |    |    |    |    |    |    |    |    |    |    |    |

Derivation processes of the foregoing formula (1) to formula (3) are described below by using an example in which the frequency domain unit is a subchannel.

$n_{subCH}^{start1}$ and $n_{subCH}^{start2}$ are used to represent a first start subchannel index and a second start subchannel index. When a quantity L of subchannels is determined, $n_{subCH}^{start1}$ and $n_{subCH}^{start2}$ each have (N−L+1) possible frequency domain locations in total. To be specific, the FRIV may have $(N-L+1)^2$ different values, and each value determines a set of $n_{subCH}^{start1}$, $n_{subCH}^{start2}$, and L.

Figure 7:
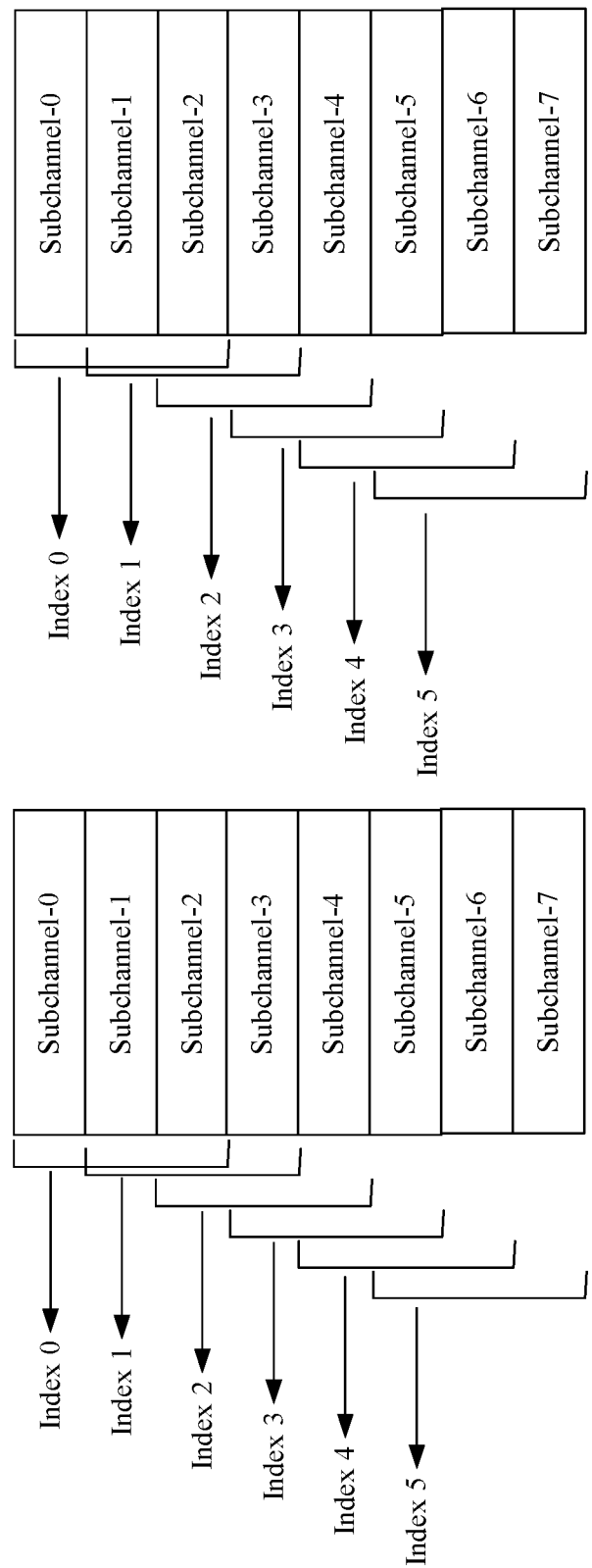
FIG. 7 is a schematic diagram of a start frequency domain unit index according to an embodiment of this application.

For example, referring to FIG. 7, N=8 and L=3. The first start subchannel index $n_{subCH}^{start1}$ has six possibilities, as shown on a left side of FIG. 7, and the second start subchannel index $n_{subCH}^{start2}$ has six possibilities, as shown on a right side of FIG. 7. The FRIV needs to indicate 36 possible combinations of $n_{subCH}^{start1}$ and $n_{subCH}^{start2}$. FIG. 7 shows one of the 36 possible combinations of $n_{subCH}^{start1}$ and $n_{subCH}^{start2}$. That $n_{subCH}^{start1}=1$ indicates a subchannel-1, and the second data channel includes the subchannel-1, a subchannel-2, and a subchannel-3. That $n_{subCH}^{start1}=3$ indicates the subchannel-3, and the second data channel includes the subchannel-3, a subchannel-4, and a subchannel-5.

For example, N=5. The following Table 1 shows possible values of the FRIV. A row index in Table 1 corresponds to a length L of a data channel, and a value range of the row index is from 1 to L. A column index indicates a set of start subchannel indexes $n_{subCH}^{start1}$ and $n_{subCH}^{start2}$, and a value range of the column index is from 0 to $(N-L+1)^2-1$.

In a possible implementation, L represents the row index, that L=1 corresponds to FRIVs in the first row in Table 1, that L=2 corresponds to FRIVs in the second row in Table 1, and so on. The first start subchannel index $n_{subCH}^{start1}$=column index/(N−L+1), and the second start subchannel index $n_{subCH}^{start2}$=column index % (N−L+1). It may be understood that the column index=(N−L+1)*$n_{subCH}^{start1}$+$n_{subCH}^{start2}$, where "/" represents a division operation, and "%" represents a remainder operation. The column index=0, 1, . . . , and $(N-L+1)^2-1$, which respectively represent the first column, the second column, and the like in Table 1.

For example, 26 in Table 1 is located in the second row and has a row index 2, that is, L=2. 26 is located in the second column and has a column index 1. When $n_{subCH}^{start1}=0$ and $n_{subCH}^{start2}=1$, the column index is (N−L+1)*$n_{subCH}^{start1}$+$n_{subCH}^{start2}$=1.

Further, if the $L^{th}$ row in Table 1 meets $(L-1)>\lfloor n/2 \rfloor$, elements in the $L^{th}$ row may be mapped, to be specific, the elements in the $L^{th}$ row are filled in the $(N-L+2)^{th}$ row in a reverse order. The $L^{th}$ row and the $(N-L+2)^{th}$ row are mapping rows for each other, for example, the $(N-L+2)^{th}$ row may be referred to as a mapping row of the $L^{th}$ row, and the $L^{th}$ row may be referred to as a mapping row of the $(N-L+2)^{th}$ row. For example, elements in the fifth row are mapped to the second row, and 41 in Table 1 is inverted to be filled in the second row; elements in the fourth row are mapped to the third row, and so on. For example, 54, 53, 52, and 51 in the fourth row in the table are sequentially filled in the third row in a reverse order. An order of 54, 53, 52, and 51 in the third row is opposite to an order of these elements in the fourth row, which are sequentially 51, 52, 53, and 54. 51 is in the $10^{th}$ column and corresponds to a column index 9, 52 is in the $11^{th}$ row and corresponds to a column index 10, 53 is in the $12^{th}$ row and corresponds to a column index 11, and 53 is in the $12^{th}$ row and corresponds to a column index 11. After mapping processing is performed, the following Table 2 may be obtained.

TABLE 2

| 0  | 1  | 2  | 3  | 4  | 5  | 6  | 7  | 8  | 9  | 10 | 11 | 12 | 13 | 14 | 15 | 16 | 17 | 18 | 19 | 20 | 21 | 22 | 23 | 24 |
|----|----|----|----|----|----|----|----|----|----|----|----|----|----|----|----|----|----|----|----|----|----|----|----|----|
| 25 | 26 | 27 | 28 | 29 | 30 | 31 | 32 | 33 | 34 | 35 | 36 | 37 | 38 | 39 | 40 | 41 |    |    |    |    |    |    |    |    |
| 42 | 43 | 44 | 45 | 46 | 47 | 48 | 49 | 50 | 51 | 52 | 53 | 54 |    |    |    |    |    |    |    |    |    |    |    |    |

Table 2 has the following features: (1) A total quantity of elements in the $L^{th}$ row is $(N-L+1)^2+(L-1)^2$.

It may be understood that the quantity of elements in the $L^{th}$ row in Table 2 is equal to the sum of a quantity of elements in the row in Table 1 and a quantity of elements included in the $(L')^{th}$ row (L'=N+2−L) mapped to the $L^{th}$ row. The $L^{th}$ row in Table 1 includes $(N-L+1)^2$ elements, and the mapping row includes $(N-L'+1)^2$ elements, that is, $(L-1)^2$ elements. Therefore, the total quantity of elements in the $L^{th}$ row in Table 2 is $(N-L+1)^2+(L-1)^2$.

(2) A start FRIV in each row is equal to a total quantity of elements in all rows before the row in Table 2, and the start FRIV may be an FRIV corresponding to a column index 0.

For example, the start FRIV value in the third row is 42, and there are 42 elements before 42 in Table 2.

(3) An FRIV meeting $(L-1) \leq \lfloor N/2 \rfloor$ in Table 2 is equal to the sum of a start FRIV in a row in which the FRIV is located and a column index corresponding to the FRIV.

The column index of the FRIV/(N−L+1) is equal to the first start subchannel index $n_{subCH}^{start1}$, and the column index of the FRIV % (N−L+1) is equal to the second start subchannel index $n_{subCH}^{start2}$, that is, the column index= (N−L+1)*$n_{subCH}^{start1}$+$n_{subCH}^{start2}$.

For example, the element "35" in Table 2 is the sum of a start FRIV 25 in the second row (L=2) and a column index 10. Based on the column index 10 corresponding to 35, it may be further determined that the first start subchannel index $$n_{subCH}^{start1} = \frac{10}{5-2+1} = 2$$

and the second start subchannel index $n_{subCH}^{start2}=10\%(5-2+1)=2$.

(4) An FRIV meeting $$(L-1) > \left\lfloor \frac{N}{2} \right\rfloor$$

in Table 2 is equal to a start FRIV in a mapping row plus a total quantity of elements in the row after mapping is performed and minus 1 and further minus a column index of the FRIV before mapping is performed.

For example, the element "53" in Table 2 corresponds to L=4 and L'=3, that is, the element is in the third row in Table 2, where the start FRIV in the third row is 42. Based on L'=3 and N=5, a total quantity of elements in the third row is $(N-L'+1)^2+(L'-1)^2=(5-3+1)^2+(3-1)^2=13$. A column index of "53" is 1 in Table 1 before mapping is performed, and therefore 53=42+13−1.

The foregoing formula (1), formula (2), and formula (3) may be obtained based on the foregoing features. Specifically, when $(L-1) \leq \lfloor n/2 \rfloor$ and L=1, because a total quantity of all elements before the row after the mapping processing is 0, the FRIV includes only a combined value $(N-L+1)*n_{subCH}^{start1}+n_{subCH}^{start2}$ of the start subchannel indexes $n_{subCH}^{start1}$ and $n_{subCH}^{start2}$. The combined value is the column index of the FRVI before the mapping processing.

When L>1, the FRIV may be divided into two parts, where $\Sigma_{i=0}^{L-2}(N-i)^2+\Sigma_{i=0}^{L-2}i^2$ is a total quantity of elements in all rows before the row in Table 2, and $(N-L+1)*n_{subCH}^{start1}+n_{subCH}^{start2}$ is the combined value of the start subchannel indexes $n_{subCH}^{start1}$ and $n_{subCH}^{start2}$. The combined value is the column index of the FRVI before the mapping processing.

When $(L-1) > \lfloor N/2 \rfloor$, $\Sigma_{i=0}^{N-L+1}(N-i)^2+\Sigma_{i=0}^{N-L+1}i^2$ represents a start FRIV in a next row of a mapping row in Table 2, that is, a total quantity of elements in all rows before the next row of the mapping row in Table 2; (N−L+2) represents a mapping row index corresponding to L; and $(N-L+1)*n_{subCH}^{start1}+n_{subCH}^{start2}$ is the combined value of the start subchannel indexes $n_{subCH}^{start1}$ and $n_{subCH}^{start2}$, where $n_{subCH}^{start1}$ is $n^{start1}$ in the formulas (1) to (3), and $n_{subCH}^{start2}$ is $n^{start2}$ in the formulas (1) to (3).

602. The first terminal apparatus sends the control information and the first data channel to a second terminal apparatus in a first time unit.

In specific implementation, the first terminal apparatus sends a control channel such as a PSCCH in the first time unit. The control channel carries the control information.

A time domain resource of the first data channel may include one or more time units, the one or more time units include the first time unit, and the first time unit may be considered as an earliest time unit in the one or more time units in time domain.

603. The second terminal apparatus receives the control information, and determines the quantity of first frequency domain units, the first start frequency domain unit index, and the second start frequency domain unit based on the first field in the control information.

In specific implementation, the second terminal device may decode the control information to obtain the first field, and determine a frequency domain resource of the second data channel and a frequency domain resource of the third data channel based on the value of the first field.

In a possible implementation, the value of the first field may be represented as an FRIV, and the second terminal apparatus may determine the two start frequency domain unit indexes $n^{start1}$ and $n^{start2}$ and the quantity L of first frequency domain units based on the FRIV.

For example, the second terminal apparatus determines a parameter l, and determines, based on the parameter l and the value (the FRIV) of the first field, the quantity L of first frequency domain units and the two start frequency domain unit indexes $n^{start1}$ and $n^{start2}$ that are indicated by the FRIV.

$$l = 1, \ldots, \left\lfloor \frac{N}{2} \right\rfloor + 1.$$

Specifically, an FRIV interval (that is, the value interval in the embodiments of this application) is calculated based on l. When the value FRIV of the first field belongs to the interval, the quantity L of first frequency domain units is determined based on N and l, and the first start frequency domain unit index $n^{start1}$ and the second start frequency domain unit index $n^{start2}$ are determined based on the FRIV, the quantity L of first frequency domain units, and N. When the FRIV indicated by the first field does not belong to the interval, the parameter l is increased by 1, and the foregoing steps continue to be performed until the value of the first field belongs to the determined FRIV interval.

For example, a start FRIV value $f_l^s$ of an FRIV interval 0 corresponding to l=1 and an end FRIV value $f_l^e$ of the FRIV interval 0 are first calculated. A start FRIV value $f_l^s$ and an end FRIV value $f_l^e$ that correspond to a row number l are calculated according to the following formulas (4) and (5):

$$f_l^s=0 \qquad (4)$$

$$f_l^e=\Sigma_{i=0}^{l+1-2}(N-i)^2+\Sigma_{i=0}^{l+1-2}i^2-1 \qquad (5)$$

If the FRIV indicated by the first field belongs to the FRIV interval 0, it is determined whether the FRIV is less than or equal to $f_l^s+(N-(l-1))^2-1$. If the FRIV is less than or equal to $f_l^s+(N-(l-1))^2-1$, the start frequency domain unit indexes $n^{start1}$ and $n^{start2}$ and a frequency domain unit length L are calculated based on a result (1); or if the FRIV is not less than or equal to $f_l^s+(N-(l-1))^2-1$, the start frequency domain unit indexes $n^{start1}$ and $n^{start2}$ and the quantity L of first frequency domain units are calculated based on a result (2).

Result (1):

$$L=l$$

$$n^{start1}=\lfloor (FRIV-f_l^s)/(N-L+1) \rfloor$$

$$n^{start2}=(FRIV-f_l^s)-n^{start1}*(N-L+1)$$

Result (2):

$$L=N-l+2$$

$$n^{start1}=\lfloor (f_l^e-FRIV)/(N-L+1) \rfloor$$

$$n^{start2}=(f_l^e-FRIV)-n^{start1}*(N-L+1)$$

If the FRIV indicated by the first field does not belong to the FRIV interval 0, l is increased by 1, and a start FRIV value $f_1^s$ of an FRIV interval 1 and an end FRIV value $f_1^e$ of the FRIV interval 1 are calculated when l=2.

It should be noted that when $$l = 2, \ldots, \left\lfloor \frac{N}{2} \right\rfloor,$$

a start value and an end value of the FRIV interval are calculated according to the following formulas (6) and (7):

$$f_l^s = \Sigma_{i=0}^{l-2}(N-i)^2 + \Sigma_{i=0}^{l-2} i^2 \quad (6)$$

$$f_l^e = \Sigma_{i=0}^{l+1-2}(N-i)^2 + \Sigma_{i=0}^{l+1-2} i^2 - 1 \quad (7)$$

It should be noted that when $$l = \left\lfloor \frac{N}{2} \right\rfloor + 1,$$

the start value and the end value of the FRIV interval are calculated according to the following formulas (8) and (9):

$$f_l^s = \sum_{i=0}^{l-2}(N-i)^2 + \sum_{i=0}^{l-2} i^2 \quad (8)$$

$$f_l^e = N*(N+1)*\frac{(2*N+1)}{6} - 1 \quad (9)$$

That N=7 is used as an example below. Assuming that the FRIV indicated by the first field is 99, a process of determining the quantity L of first frequency domain units, the first start frequency domain unit index $n^{start1}$, and the second start frequency domain unit index $n^{start2}$ based on the FRIV is as follows.

First, the start FRIV value $f_1^s=0$ and the end FRIV value $f_1^e=48$ that correspond to l=1 are calculated by using the formulas (4) and (5). Because 99 does not belong to the interval, the start FRIV value $f_2^s=49$ and the end FRIV value $f_2^s=85$ that correspond to l=2 are calculated by using the formulas (6) and (7), and then it is determined whether the FRIV belongs to the interval. Because 99 does not belong to the interval, the start FRIV value $f_3^s=86$ and the end FRIV value $f_3^s=114$ that correspond to l=3 are calculated by using the formulas (6) and (7), and then it is determined whether the FRIV belongs to the interval. Because 99 belongs to the interval, it is determined whether 99 is less than or equal to $f_3^s+(N-(3-1))^2-1=110$. Because 99 is less than 110, it may be obtained, through calculation based on the result (1), that the start frequency domain unit indexes meet $n^{start1}=3$ and $n^{start2}=2$ and the frequency domain unit length meets L=3.

In a possible implementation, a time unit (e.g., the first time unit in this embodiment of this application) in which the first terminal apparatus sends the control information may be a time unit of the first data channel. The control information may further include a second field, where a value of the second field is used to determine a time unit of the second data channel and a time unit of the third data channel.

Optionally, that the first terminal apparatus determines control information includes: determining the value of the second field based on a first time domain interval $T_{gap1}$ and a second time domain interval $T_{gap2}$.

The first time domain interval $T_{gap1}$ is an interval between the time unit of the first data channel and the time unit of the second data channel, and the second time domain interval $T_{gap2}$ is an interval between the time unit of the first data channel and the time unit of the third data channel; or the first time domain interval $T_{gap1}$ is the interval between the time unit of the first data channel and the time unit of the second data channel, and the second time domain interval $T_{gap2}$ is an interval between the time unit of the second data channel and the time unit of the third data channel.

In a possible implementation, the value of the second field is a time resource indication value (TRIV).

When the first terminal apparatus sends one data channel, for example, the first data channel in this embodiment of this application, the TRIV=0.

When the first terminal apparatus sends two data channels, for example, the first data channel and the second data channel in this embodiment of this application, the TRIV=$T_{gap1}$, where $T_{gap1}$ is greater than or equal to 1 and less than or equal to W−1.

If the first terminal apparatus sends three data channels, for example, the first data channel, the second data channel, and the third data channel in this embodiment of this application, when $(T_{gap2}-1) \leq \lfloor N_{slot}/2 \rfloor$, the TRIV meets the following formula (10):

$$TRIV = N_{slot}*(T_{gap2}-1) + T_{gap1} + W \quad (10)$$

When $(T_{gap2}-1) > \lfloor N_{slot}/2 \rfloor$, the TRIV meets the following formula (11):

$$TRIV = N_{slot}*(N_{slot}-T_{gap2}+1) + (N_{slot}-1-T_{gap1}) + W \quad (11)$$

The TRIV represents the value of the second field; the parameter W is a first time window, and the first time unit, the second time unit, or the third time unit is located in the first time window; a value of W is greater than 1; and $N_{slot}$ is a maximum value of the first time domain interval or the second time domain interval, where $N_{slot}$=W−2, $0 \leq T_{gap1} \leq N_{slot}-1$, and $1 \leq T_{gap2} \leq N_{slot}$.

It should be noted that the time units of the first data channel, the second data channel, and the third data channel may be limited as follows:

The time unit of the first data channel is before the time unit of the second data channel and the time unit of the third data channel; or the time unit of the first data channel is between the time unit of the second data channel and the time unit of the third data channel; or the time unit of the first data channel is after the time unit of the second data channel and the time unit of the third data channel.

The second terminal apparatus may further determine the time unit of the first data channel based on a time unit for receiving the control information, determine the time unit of the second data channel based on the time unit and $T_{gap1}$, and determine the time unit of the third data channel based on the time unit, $T_{gap1}$, and/or $T_{gap2}$. It should be noted that if the value of the second field in the control information is TRIV=0, the control information indicates one data channel, and a time unit of the data channel is a time unit in which the second terminal apparatus receives the control information. If $1 \leq TRIV \leq W-1$, the TRIV is used to determine one time interval, and the control information indicates two data channels. A time unit of one data channel is a time unit for receiving the control information, and an interval between the other data channel and the data channel in time domain is a time interval corresponding to the TRIV. If TRIV≥W, the TRIV is used to determine two time intervals, and the control information indicates three data channels. The time unit of the first data channel is a time unit for receiving the control information, an interval between the second data channel and the first data channel in time domain is one time interval determined by the TRIV, and an interval between the third data channel and the first data channel (or the second data channel) in time domain is the other time interval determined by the TRIV.

Optionally, the first terminal apparatus determines the value of the second field according to the foregoing formula (10) or formula (11), and that the second terminal apparatus determines two time intervals $T_{gap1}$ and $T_{gap2}$ based on the value TRIV of the second field includes the following.

First, a value x of $\lfloor(TRVI-W)/N_{slot}\rfloor+(TRVI-W) \% N_{slot}$ is calculated. When $x<N_{slot}$, $(T_{gap2}-1)\le\lfloor N_{slot}/2\rfloor$ is met, and $T_{gap1}=(TRIV-W) \% N_{slot}$, and $T_{gap2}=\lfloor(TRIV-W)/N_{slot}\rfloor+1$.

When $x\ge N_{slot}$, $(T_{gap2}-1)>\lfloor N_{slot}/2\rfloor$ is met, and $T_{gap1}=N_{slot}-(TRIV-W) \% N_{slot}-1$ and $T_{gap2}=N_{slot}-\lfloor(TRIV-W)/N_{slot}\rfloor+1$.

In a possible implementation, when $(T_{gap1}-1)\le\lfloor N_{slot}/2\rfloor$, the TRIV meets the following formula (12):

$$TRIV=N_{slot}*(T_{gap1}-1)+T_{gap2} \qquad (12)$$

When $(T_{gap1}-1)>\lfloor N_{slot}/2\rfloor$, the TRIV meets the following formula (13):

$$TRIV=N_{slot}*(N_{slot}-T_{gap1}+1)+(N_{slot}-1-T_{gap2}) \qquad (13)$$

When the first terminal apparatus determines the value of the first field according to the formula (8) or (9), that the second terminal apparatus determines two time intervals $T_{gap1}$ and $T_{gap2}$ based on the value of the first field includes the following.

A value x of $\lfloor TRVI/N_{slot}\rfloor+TRVI \% N_{slot}$ is calculated. When $x<N_{slot}$, $(T_{gap2}-1)\le\lfloor N_{slot}/2\rfloor$ is met, and $T_{gap1}=TRIV \% N_{slot}$ and $T_{gap2}=\lfloor TRIV/N_{slot}\rfloor+1$.

When $x\ge N_{slot}$, $(T_{gap2}-1)>\lfloor N_{slot}/2\rfloor$ is met, and $T_{gap1}=N_{slot}-TRIV \% N_{slot}-1$ and $T_{gap2}=N_{slot}-\lfloor TRIV/N_{slot}\rfloor+1$.

In a possible implementation, the control information further includes a third field. The third field is located in a first stage or a second stage of the control information. Specifically, when the third field has a first value, the time unit of the first data channel is before the time unit of the second data channel and the time unit of the third data channel.

When the third field has a second value, the time unit of the first data channel is between the time unit of the second data channel and the time unit of the third data channel.

When the third field has a third value, the time unit of the first data channel is after the time unit of the second data channel and the time unit of the third data channel.

In a possible implementation, when W=32, the second field has 9 bits, which indicate a total of 512 possible time domain intervals, and the third field has 2 bits, which may indicate the first value, the second value, or the third value. For example, the third field "00" indicates the first value "0", the third field "01" indicates the second value "1", and the third field "10" indicates the third value "2".

When the frequency domain unit is a subchannel, L in this embodiment of this application may be identified as $L_{subCH}$, N may be identified as $N_{subCH}$, $n^{start1}$ may be identified as $n_{subCH}^{start1}$, and $n^{start2}$ may be identified as $n_{subCH}^{start2}$.

A time-frequency resource of a data channel that may be indicated by the control information is described below with reference to a specific example. Assuming that the time unit is a slot, that the frequency domain unit is a subchannel, and that the second terminal apparatus receives the control information on a subchannel m in a slot $t_n^{SL}$, the data channel indicated by the control information is specifically as follows.

In a first case, the second field is "0", the start frequency domain unit indexes indicated by the first field meet $n^{start1}=n^{start2}=m$, and the quantity of first frequency domain units indicated by the first field is L.

Figure 8:
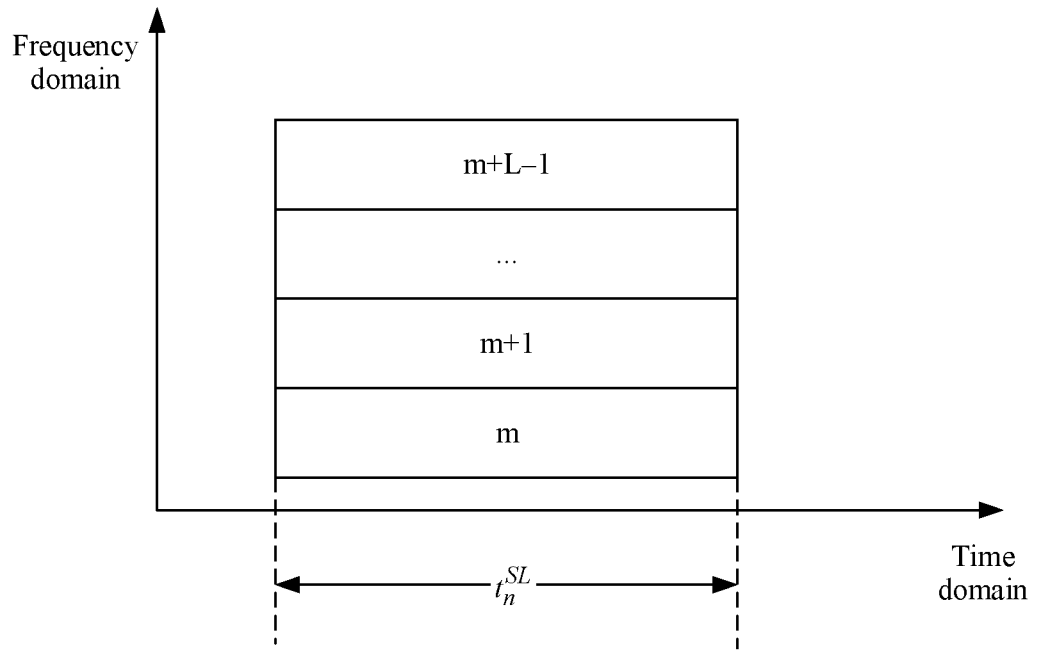
FIG. 8 to FIG. 13 are schematic diagrams of resource configuration according to an embodiment of this application.

Referring to FIG. 8, the control information indicates one data channel. The data channel is located in the slot $t_n^{SL}$ in time domain, and includes L subchannels starting from the subchannel m in frequency domain, which are respectively the subchannel m, a subchannel (m+1), . . . , and a subchannel (m+L-1).

In a second case, the value of the second field is less than W, a value of the third field is the first value, the second field indicates the time interval $T_{gap1}$, the start frequency domain unit indexes indicated by the first field meet $n^{start1}=n^{start2}$ and the quantity of first frequency domain units indicated by the first field is L.

Figure 9:
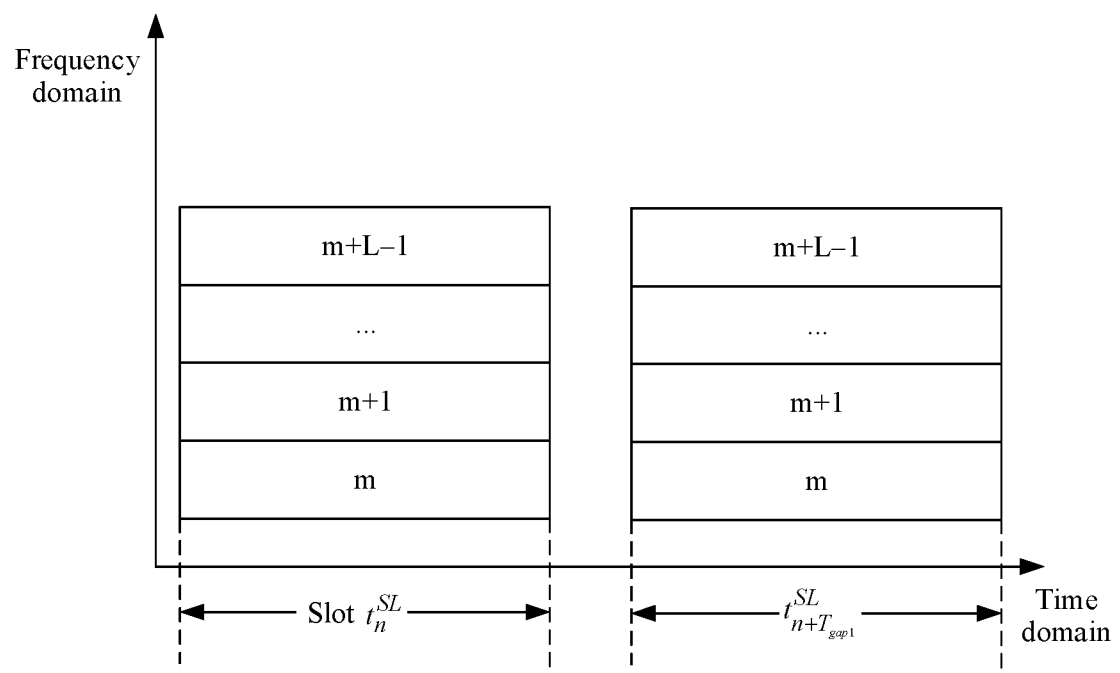

Referring to FIG. 9, the control information indicates two data channels, which are respectively a data channel 1 and a data channel 2. The data channel 1 is located in the slot $t_n^{SL}$ in time domain, and includes L subchannels starting from the subchannel m in frequency domain, which are respectively the subchannel m, a subchannel (m+1), . . . , and a subchannel (m+L-1). The data channel 2 is located in a slot $t_{n+T_{gap1}}$ in time domain, and includes L subchannels starting from a subchannel $n^{start1}$ in frequency domain, which are respectively the subchannel $n^{start1}$, a subchannel ($n^{start1}$+1), . . . , and a subchannel ($n^{start1}$+L-1).

In a third case, the value of the second field is less than W, a value of the third field is the second value, the second field indicates the time interval $T_{gap1}$, the start frequency domain unit indexes indicated by the first field meet $n^{start1}=n^{start2}$ and the quantity of first frequency domain units indicated by the first field is L.

Figure 10:
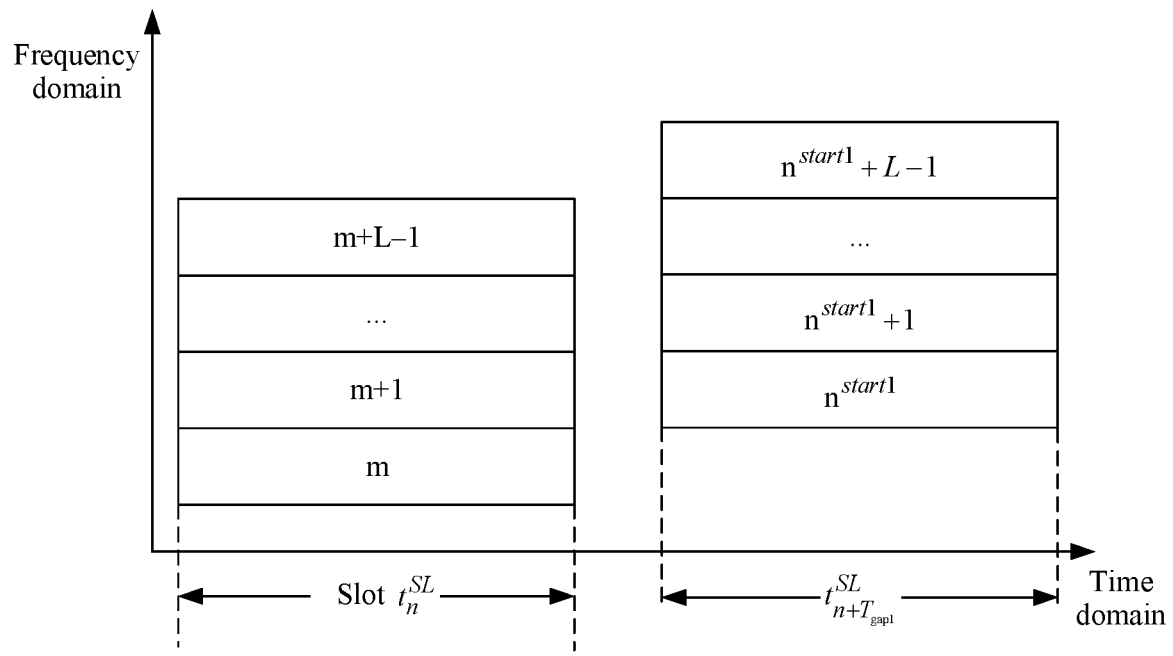

Referring to FIG. 10, the control information indicates two data channels, which are respectively a data channel 1 and a data channel 2. The data channel 1 is located in the slot $t_n^{SL}$ in time domain, and includes L subchannels starting from the subchannel m in frequency domain, which are respectively the subchannel m, a subchannel (m+1), . . . , and a subchannel (m+L-1). The data channel 2 is located in a slot $t_{n-T_{gap1}}^{SL}$ in time domain, and includes L subchannels starting from a subchannel $n^{start1}$ in frequency domain, which are respectively the subchannel $n^{start1}$, a subchannel ($n^{start1}$+1), . . . , and a subchannel ($n^{start1}$+L-1).

In a fourth case, the value of the second field is greater than or equal to W, a value of the third field is the first value, the second field indicates the time intervals $T_{gap1}$ and $T_{gap2}$, the first field indicates the start frequency domain unit indexes $n^{start1}$ and $n^{start2}$, and the quantity of first frequency domain units indicated by the first field is L.

Figure 11:
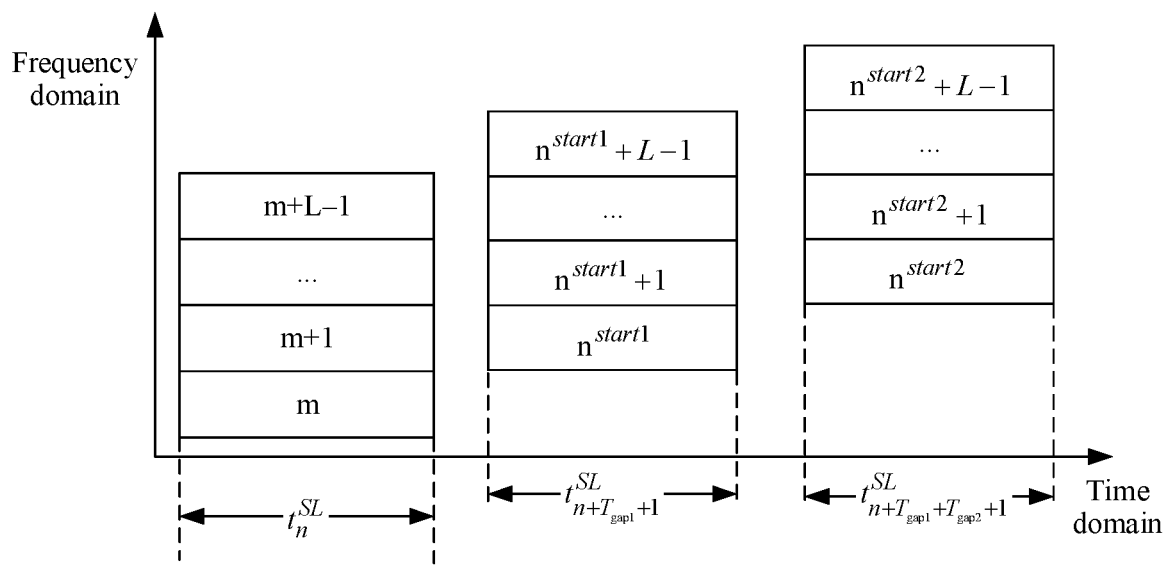

Referring to FIG. 11, the control information indicates three data channels, which are respectively a data channel 1, a data channel 2, and a data channel 3. The data channel 1 is located in the slot $t_n^{SL}$ in time domain, and includes L subchannels starting from the subchannel m in frequency domain, which are respectively the subchannel m, a subchannel (m+1), . . . , and a subchannel (m+L-1). The data channel 2 is located in a slot $t_{n+1+T_{gap1}}$ in time domain, and includes L subchannels starting from a subchannel $n^{start1}$ in frequency domain, which are respectively the subchannel $n^{start1}$, a subchannel ($n^{start1}$+1), . . . , and a subchannel ($n^{start1}$+L-1). The data channel 3 is located in a slot $t_{n+1+T_{gap1}+T_{gap2}}$ in time domain, and includes L subchannels starting from a subchannel $n^{start2}$ in frequency domain, which are respectively the subchannel $n^{start2}$, a subchannel ($n^{start2}$+1), . . . , and a subchannel ($n^{start2}$+L-1).

In a fifth case, the value of the second field is greater than or equal to W, a value of the third field is the second value, the second field indicates the time intervals $T_{gap1}$ and $T_{gap2}$, the first field indicates the start frequency domain unit indexes $n^{start1}$ and $n^{start2}$, and the quantity of first frequency domain units indicated by the first field is L.

Figure 12:
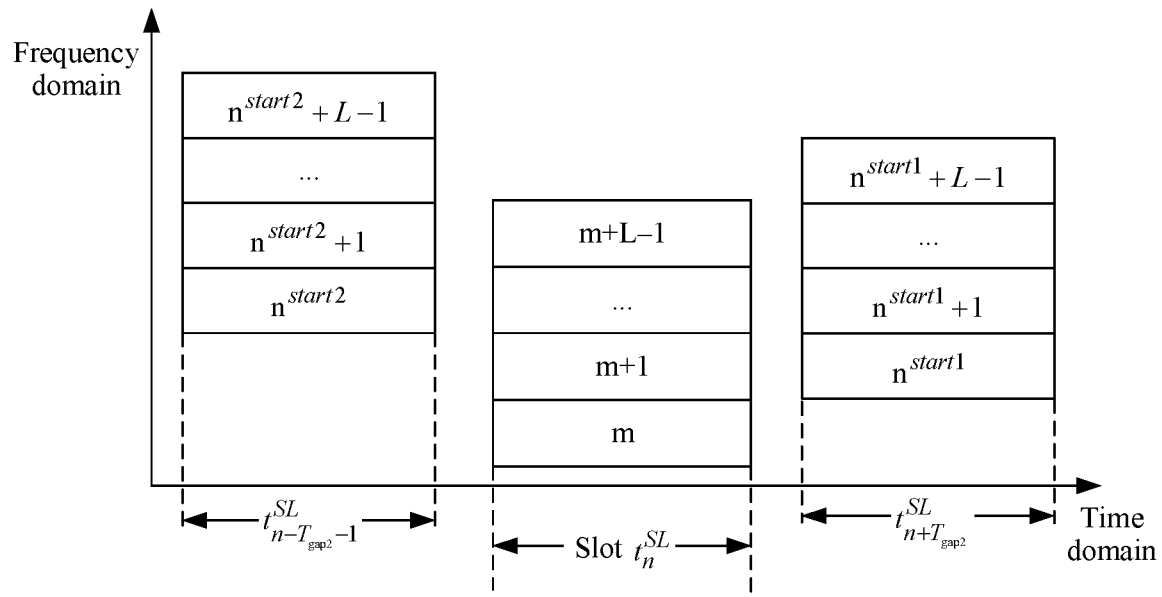

Referring to FIG. 12, the control information indicates three data channels, which are respectively a data channel 1, a data channel 2, and a data channel 3. The data channel 1 is located in the slot $t_n^{SL}$ in time domain, and includes L subchannels starting from the subchannel m in frequency domain, which are respectively the subchannel m, a subchannel (m+1), . . . , and a subchannel (m+L−1). The data channel 2 is located in a slot $(t_{n-T_{gap1}-1}^{SL})$ in time domain, and includes L subchannels starting from a subchannel $n^{start1}$ in frequency domain, which are respectively the subchannel $n^{start1}$, a subchannel ($n^{start1}$+1), . . . , and a subchannel ($n^{start1}$+L−1). The data channel 3 is located in a slot $(t_{n+T_{gap2}}^{SL})$ in time domain, and includes L subchannels starting from a subchannel $n^{start2}$ in frequency domain, which are respectively the subchannel $n^{start2}$ a subchannel ($n^{start2}$+1), . . . , and a subchannel ($n^{start2}$+L−1).

In a sixth case, the value of the second field is greater than or equal to W, a value of the third field is the third value, the second field indicates the time intervals $T_{gap1}$ and $T_{gap2}$, the first field indicates the start frequency domain unit indexes $n^{start1}$ and $n^{start2}$, and the quantity of first frequency domain units indicated by the first field is L.

Figure 13:
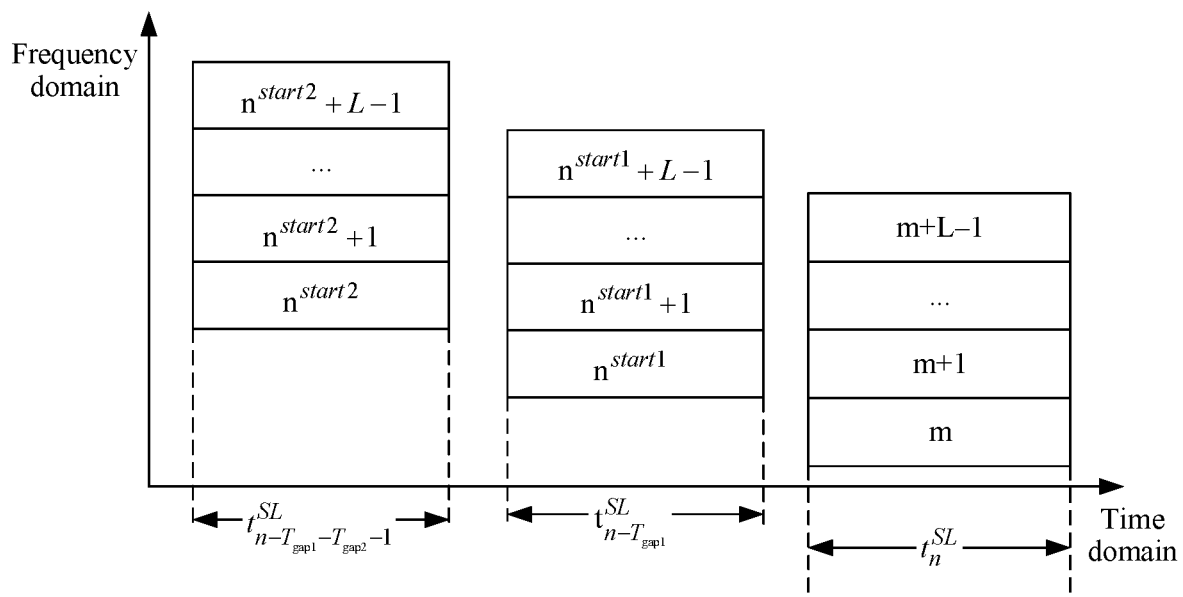

Referring to FIG. 13, the control information indicates three data channels, which are respectively a data channel 1, a data channel 2, and a data channel 3. The data channel 1 is located in the slot $t_n^{SL}$ in time domain, and includes L subchannels starting from the subchannel m in frequency domain, which are respectively the subchannel m, a subchannel (m+1), . . . , and a subchannel (m+L−1). The data channel 2 is located in a slot $(t_{n-T_{gap1}-T_{gap2}-1})$ in time domain, and includes L subchannels starting from a subchannel $n^{start1}$ in frequency domain, which are respectively the subchannel $n^{start1}$, a subchannel ($n^{start1}$+1), . . . , and a subchannel ($n^{start1}$+L−1). The data channel 3 is located in a slot $(t_{n-T_{gap1}-1})$ in time domain, and includes L subchannels starting from a subchannel $n^{start2}$ in frequency domain, which are respectively the subchannel $n^{start2}$ a subchannel ($n^{start2}$+1), . . . , and a subchannel ($n^{start2}$+L−1).

It should be noted that the first field in this embodiment of this application may be a frequency resource assignment field, the second field may be a time resource assignment field, and the third field may be a retransmission indication field. In addition, the control information in this embodiment of this application may alternatively be downlink control information (DCI). In this scenario, a network device sends the DCI to a terminal apparatus, where the DCI may include a first field and/or a second field. For a method for determining values of the first field and the second field, refer to the foregoing description. Details are not described herein again. The first field in the DCI is used to determine two start frequency domain unit indexes and a quantity of frequency domain units, and a frequency domain resource on a sidelink may be determined based on the start frequency domain unit indexes and the quantity of frequency domain units. The second field in the DCI is used to determine a time domain interval, and a time unit for sending a PSSCH and/or a PSCCH may be determined based on a time unit for receiving or sending SCI and the time domain interval indicated by the DCI.

In a possible implementation, the network device may send RRC signaling to the terminal apparatus, where the RRC signaling may include a first field and/or a second field. For a method for determining values of the first field and the second field, refer to the foregoing description. The RRC signaling indicates a configure grant. In a period of the configure grant, the first field in the RRC signaling is used to determine one or more start frequency domain unit indexes and a quantity of frequency domain units, and the configure grant may be allocated to a sidelink based on the start frequency domain unit indexes and the quantity of frequency domain units. In a period of the configure grant, the second field in the RRC signaling is used to determine a time domain interval, and a time unit of the configure grant may be determined based on a time offset indicated by the RRC signaling and the time domain interval indicated by the RRC signaling.

The RRC signaling may further include a fourth field. The first field and the second field in the RRC signaling indicate a set of time-frequency resources, and the set of time-frequency resources may be periodically repeated in time domain in a period of the configure grant. The set of time-frequency resources includes one or more sidelink resources. The fourth field indicates an interval between two sets of time-frequency resources. The interval may be an interval between the last time-frequency resource in the $i^{th}$ set and the first time-frequency resource in the $(i+1)^{th}$ set, or may be an interval between the first time-frequency resource in the $i^{th}$ set and the first time-frequency resource in the $(i+1)^{th}$ set.

The RRC signaling may further include a fifth field, and the fifth field is used to indicate a quantity of time-frequency resources in a period of the configure grant. The time-frequency resource is any resource in the set of time-frequency resources indicated by the first field and the second field in the RRC signaling.

Figure 14:
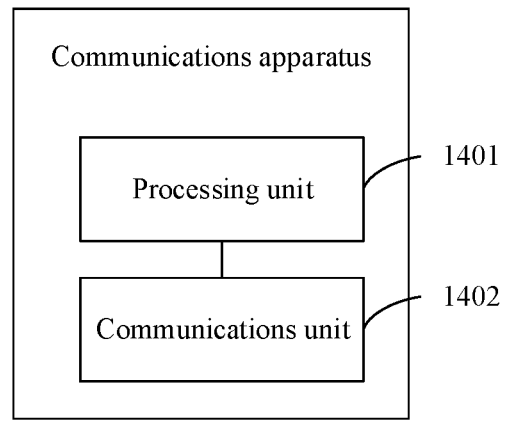
FIG. 14 to FIG. 17 are block diagrams of other structures of communications apparatuses according to embodiments of this application.

When function modules are obtained through division based on corresponding functions, FIG. 14 is a schematic diagram of a possible structure of a communications apparatus in the foregoing embodiment. The communications apparatus shown in FIG. 14 may be the terminal apparatus described in embodiments of this application, or may be a component that implements the foregoing method in the terminal apparatus, or may be a chip used in the terminal apparatus. The chip may be a system-on-a-chip (SoC), a baseband chip having a communications function, or the like. As shown in FIG. 14, the communications apparatus includes a processing unit 1401 and a communications unit 1402. The processing unit may be one or more processors, and the communications unit may be a transceiver.

The processing unit 1401 is configured to support the terminal apparatus in performing step 601, step 603, and/or another process of the technology described in this specification.

The communications unit 1402 is configured to support communication between the terminal apparatus and another communications apparatus, for example, support the terminal apparatus in performing step 602, and/or is configured to perform another process of the technology described in this specification.

It should be noted that all related content of the steps in the foregoing method embodiment may be cited in function descriptions of corresponding function modules. Details are not described herein again.

Figure 15:
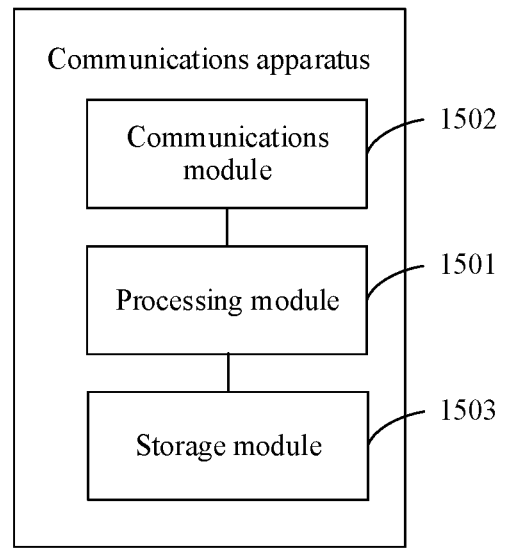

For example, when an integrated unit is used, a schematic diagram of a structure of a communications apparatus according to an embodiment of this application is shown in FIG. 15. In FIG. 15, the communications apparatus includes a processing module 1501 and a communications module 1502. The processing module 1501 is configured to control and manage actions of the communications apparatus, for example, perform the step performed by the processing unit 1401, and/or another process of the technology described in this specification. The communications module 1502 is configured to: perform the step performed by the communications unit 1402, and support interaction between the communications apparatus and another device, for example, interaction with another terminal apparatus. As shown in FIG. 15, the communications apparatus may further include a storage module 1503, and the storage module 1503 is configured to store program code and data of the communications apparatus.

When the processing module 1501 is a processor, the communications module 1502 is a transceiver, and the storage module 1503 is a memory, the communications apparatus is the communications apparatus shown in FIG. 5a.

Figure 16:
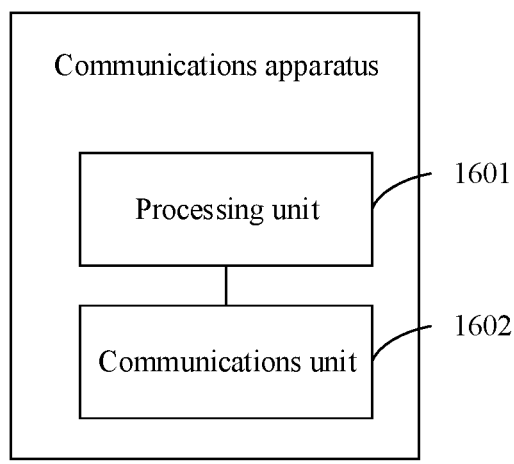

When function modules are obtained through division based on corresponding functions, FIG. 16 is a schematic diagram of a possible structure of a communications apparatus in the foregoing embodiment. The communications apparatus shown in FIG. 16 may be the network device in embodiments of this application, may be a component that implements the foregoing method in the network device, or may be a chip used in the network device. The chip may be a system-on-a-chip (SoC), a baseband chip having a communications function, or the like. As shown in FIG. 16, the communications apparatus includes a processing unit 1601 and a communications unit 1602. The processing unit 1601 may be one or more processors, and the communications unit 1602 may be a transceiver.

The processing unit 1601 is configured to support internal processing of the network device, for example, generate DCI or RRC signaling in embodiments of this application, and/or is configured to perform another process of the technology described in this specification.

The communications unit 1602 is configured to support communication between the network device and another communications apparatus, for example, support the network device in sending DCI or RRC signaling to a terminal apparatus, and/or is configured to perform another process of the technology described in this specification.

It should be noted that all related content of the steps in the foregoing method embodiment may be cited in function descriptions of corresponding function modules. Details are not described herein again.

Figure 17:
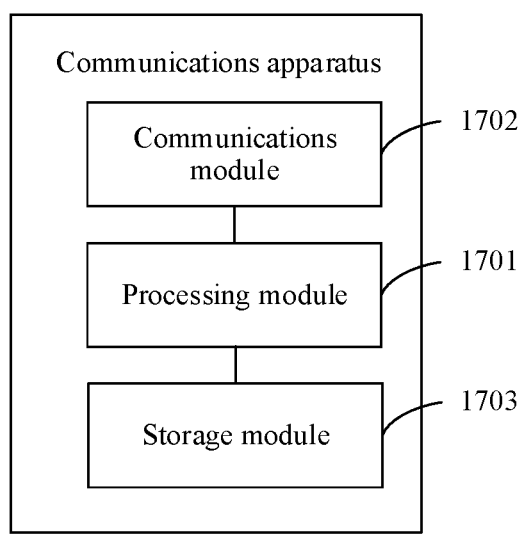

For example, when an integrated unit is used, a schematic diagram of a structure of a communications apparatus according to an embodiment of this application is shown in FIG. 17. In FIG. 17, the communications apparatus includes a processing module 1701 and a communications module 1702. The processing module 1701 is configured to control and manage actions of the communications apparatus, for example, perform the step performed by the processing unit 1601, and/or another process of the technology described in this specification. The communications module 1702 is configured to: perform the step performed by the communications unit 1602, and support interaction between the communications apparatus and another device, for example, interaction with another network device. As shown in FIG. 17, the communications apparatus may further include a storage module 1703, and the storage module 1703 is configured to store program code and data of the communications apparatus.

When the processing module 1701 is a processor, the communications module 1702 is a transceiver, and the storage module 1703 is a memory, the communications apparatus is the communications apparatus shown in FIG. 5b.

An embodiment of this application provides a computer-readable storage medium. The computer-readable storage medium stores instructions. The instructions are used to perform the method shown in FIG. 6.

An embodiment of this application provides a computer program product including instructions. When the computer program product runs on a communications apparatus, the communications apparatus is enabled to perform the method shown in FIG. 6.

An embodiment of this application provides a wireless communications apparatus. The wireless communications apparatus stores instructions. When the wireless communications apparatus runs on the communications apparatuses shown in FIG. 5a, FIG. 5b, and FIG. 14 to FIG. 17, the communications apparatus is enabled to perform the method shown in FIG. 6. The wireless communications apparatus may be a chip.

Based on the descriptions of the foregoing implementations, a person skilled in the art can clearly understand that, for ease and brevity of description, division into the foregoing function modules is merely used as an example for illustration. During actual application, the foregoing functions can be allocated to different function modules and implemented based on a requirement. In other words, an inner structure of a database access apparatus is divided into different function modules to implement all or some of the functions described above.

The processor in embodiments of this application may include but is not limited to at least one of the following computing devices that run software: a central processing unit (CPU), a microprocessor, a digital signal processor (DSP), a microcontroller unit (MCU), an artificial intelligence processor, or the like. Each computing device may include one or more cores configured to perform an operation or processing by executing software instructions. The processor may be an independent semiconductor chip, or may be integrated with another circuit to form a semiconductor chip. For example, the processor and another circuit (e.g., an encoding/decoding circuit, a hardware acceleration circuit, or various buses and interface circuits) may form a SoC (system-on-a-chip). Alternatively, the processor may be integrated into an ASIC as a built-in processor of the ASIC, and the ASIC integrated with the processor may be independently packaged or may be packaged with another circuit. In addition to the core configured to perform an operation or processing by executing software instructions, the processor may further include a necessary hardware accelerator, for example, a field programmable gate array (FPGA), a PLD (programmable logic device), or a logic circuit that implements a dedicated logic operation.

The memory in embodiments of this application may include at least one of the following types: a read-only memory (ROM) or another type of static storage device that can store static information and instructions, or a random access memory (RAM) or another type of dynamic storage device that can store information and instructions, or may be an electrically erasable programmable read-only memory (EEPROM). In some scenarios, the memory may alternatively be a compact disc read-only memory (CD-ROM) or other compact disc storage, optical disc storage (including a compact disc, a laser disc, an optical disc, a digital versatile disc, a Blu-ray disc, and the like), a magnetic disk storage medium or another magnetic storage device, or any other medium that can be used to carry or store expected program code in an instruction form or a data structure form and that can be accessed by a computer. However, the memory is not limited thereto.

In this application, "at least one" means one or more. "A plurality of" means two or more than two. "And/or" describes an association relationship between associated objects, and represents that three relationships may exist. For example, A and/or B may represent the following cases: Only A exists, both A and B exist, and only B exists, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural. In addition, to clearly describe the technical solutions in embodiments of this application, terms such as "first" and "second" are used in embodiments of this application to distinguish between same items or similar items that have basically the same functions and purposes. A person skilled in the art may understand that the terms such as "first" and "second" do not limit a quantity and an execution sequence, and the terms such as "first" and "second" do not indicate a definite difference.

In the several embodiments provided in this application, it should be understood that the disclosed database access apparatus and method may be implemented in other manners. For example, the described database access apparatus embodiments are merely examples. For example, the division into modules or units is merely logical function division and may be other division during actual implementation. For example, a plurality of units or components may be combined or integrated into another apparatus, or some features may be ignored or not performed. In addition, the displayed or discussed mutual couplings or direct couplings or communications connections may be implemented through some interfaces. The indirect couplings or communications connections between the database access apparatuses or units may be implemented in electrical, mechanical, or other forms.

The units described as separate parts may or may not be physically separate, and parts displayed as units may be one or more physical units, that is, may be located in one place, or may be distributed in a plurality of different places. Some or all of the units may be selected based on an actual requirement to achieve the objectives of the solutions of embodiments.

In addition, function units in embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions in embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor to perform all or some of the steps of the method described in embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A communications method carried out by a first terminal apparatus, the method comprising:
    determining control information that comprises a first field, wherein a value of the first field is used to indicate a quantity of first frequency domain units, a first start frequency domain unit index, and a second start frequency domain unit index; wherein the quantity of first frequency domain units is a quantity of frequency domain units comprised in a first data channel, a second data channel, or a third data channel; wherein the first start frequency domain unit index is a start frequency domain unit index of the second data channel, and wherein the second start frequency domain unit index is a start frequency domain unit index of the third data channel; and
    sending the control information and the first data channel to a second terminal apparatus in a first time unit.

2. The method according to claim 1, wherein the determining control information comprises:
    determining the value of the first field based on the first start frequency domain unit index, the second start frequency domain unit index, the quantity of first frequency domain units, and a quantity of frequency domain units comprised in a sidelink resource pool.

3. The method according to claim 1, wherein the control information further comprises a second field, wherein a value of the second field is used to determine a second time unit carrying the second data channel and a third time unit carrying the third data channel.

4. The method according to claim 3, wherein the determining control information further comprises:
    determining the value of the second field based on a first time domain interval ($T_{gap1}$) and a second time domain interval ($T_{gap2}$), wherein the first data channel, the second data channel, and the third data channel are located in different time units; and wherein:
    $T_{gap1}$ is an interval between the first time unit and the second time unit, and $T_{gap2}$ is an interval between the first time unit and the third time unit; or
    $T_{gap1}$ is the interval between the first time unit and the second time unit, and $T_{gap2}$ is an interval between the second time unit and the third time unit.

5. The method according to claim 4, wherein the determining the value of the second field based on $T_{gap1}$ and $T_{gap2}$ comprises:
    when $(T_{gap2}-1) \leq \lfloor N_{slot}/2 \rfloor$, $TRIV=N_{slot}*(T_{gap2}-1)+T_{gap1}+W$ or $TRIV=N_{slot}*(T_{gap2}-1)+T_{gap1}$; and
    when $(T_{gap2}-1) > \lfloor N_{slot}/2 \rfloor$, $TRIV=N_{slot}*(N_{slot}-T_{gap2}+1)+(N_{slot}-1-T_{gap1})+W$ or $TRIV=N_{slot}*(N_{slot}-T_{gap2}+1)+(N_{slot}-1-T_{gap1})$,
    where:
    TRIV represents the value of the second field;
    W is a first time window, and
    the first time unit, the second time unit, or the third time unit is located in the first time window; and $N_{slot}$ is a maximum value of the first time domain interval or the second time domain interval, and wherein $N_{slot}=W-2$, $0 \leq T_{gap1} \leq N_{slot}-1$, and $1 \leq T_{gap2} \leq N_{slot}$.

6. The method according to claim 5, wherein W is 32 and the second field has 9 bits.

7. The method according to claim 1, wherein the control information further comprises a third field,
wherein a relative location of a time unit of the first data channel is indicated as follows:
the third field having a first value indicates that the time unit of the first data channel is before a time unit of the second data channel and a time unit of the third data channel;
the third field having a second value indicates that the time unit of the first data channel is between the time unit of the second data channel and the time unit of the third data channel; and
the third field having a third value indicates that the time unit of the first data channel is after the time unit of the second data channel and the time unit of the third data channel.

8. A communications method carried out by a second terminal apparatus, the method comprising:
receiving, in a first time unit, control information and a first data channel that are sent by a first terminal apparatus, wherein the control information comprises a first field; and
determining a quantity of first frequency domain units, a first start frequency domain unit index, and a second start frequency domain unit index based on a value of the first field,
wherein the quantity of first frequency domain units is a quantity of frequency domain units comprised in the first data channel, a second data channel, or a third data channel,
wherein the first start frequency domain unit index is a start frequency domain unit index of the second data channel, and
wherein the second start frequency domain unit index is a start frequency domain unit index of the third data channel.

9. The method according to claim 8, wherein the control information further comprises a second field that is used to determine a second time unit carrying the second data channel and a third time unit carrying the third data channel.

10. The method according to claim 9, wherein the method further comprises:
determining a first time domain interval ($T_{gap1}$) and a second time domain interval ($T_{gap2}$) based on the value of the second field, wherein the first data channel, the second data channel, and the third data channel are located in different time units; and wherein:
$T_{gap1}$ is an interval between the first time unit and the second time unit, and $T_{gap2}$ is an interval between the first time unit and the third time unit; or
$T_{gap1}$ is the interval between the first time unit and the second time unit, and $T_{gap2}$ is an interval between the second time unit and the third time unit.

11. The method according to claim 10, wherein the determining $T_{gap1}$ and $T_{gap2}$ based on the value of the second field comprises:
calculating a value x of $\lfloor TRVI/N_{slot} \rfloor + TRVI \% N_{slot}$, where:
when $x < N_{slot}$, $(T_{gap2}-1) \leq \lfloor N_{slot}/2 \rfloor$ is met, $T_{gap1}=$ TRVI $\% N_{slot}$ and $T_{gap2}=\lfloor TRVI/N_{slot} \rfloor + 1$; and
when $x \geq N_{slot}$, $(T_{gap2}-1) > \lfloor N_{slot}/2 \rfloor$ is met, $T_{gap1}=N_{slot}-$ TRVI $\% N_{slot}-1$ and $T_{gap2}=N_{slot}-\lfloor TRVI/N_{slot} \rfloor+1$; or calculating a value x of $\lfloor (TRVI-W)/N_{slot} \rfloor + (TRVI-W) \% N_{slot}$, where:
when $x < N_{slot}$, $(T_{gap2}-1) \leq \lfloor N_{slot}/2 \rfloor$ is met, $T_{gap1}=(TRVI-W) \% N_{slot}$ and $T_{gap2}=\lfloor (TRVI-W)/N_{slot} \rfloor + 1$; and
when $x \geq N_{slot}$, $(T_{gap2}-1) > \lfloor N_{slot}/2 \rfloor$ is met, and $T_{gap1}=N_{slot}-(TRVI-W) \% N_{slot}-1$ and $T_{gap2}=N_{slot}-\lfloor (TRVI-W)/N_{slot} \rfloor+1$,
where:
TRIV represents the value of the second field;
W is a first time window, and
the first time unit, the second time unit, or the third time unit is located in the first time window; and
$N_{slot}$ is a maximum value of the first time domain interval or the second time domain interval,
wherein $N_{slot}=W-2$, $0 \leq T_{gap1} \leq N_{slot}-1$, and $1 \leq T_{gap2} \leq N_{slot}$.

12. The method according to claim 11, wherein W is 32 and the second field has 9 bits.

13. The method according to claim 8, wherein the control information further comprises a third field,
wherein a relative location of a time unit of the first data channel is indicated as follows:
the third field having a first value indicates that the time unit of the first data channel is before a time unit of the second data channel and a time unit of the third data channel;
the third field having a second value indicates that the time unit of the first data channel is between the time unit of the second data channel and the time unit of the third data channel; and
the third field having a third value indicates that the time unit of the first data channel is after the time unit of the second data channel and the time unit of the third data channel.

14. A first terminal apparatus, comprising:
one or more memories configured to store instructions; and
one or more processors coupled to the one or more memories and configured to execute the stored instructions to facilitate the apparatus carrying out a method including:
determining control information that comprises a first field, wherein a value of the first field is used to indicate a quantity of first frequency domain units, a first start frequency domain unit index, and a second start frequency domain unit index; and wherein the quantity of first frequency domain units is a quantity of frequency domain units comprised in a first data channel, a second data channel, or a third data channels; wherein the first start frequency domain unit index is a start frequency domain unit index of the second data channel, and wherein the second start frequency domain unit index is a start frequency domain unit index of the third data channel; and
sending the control information and the first data channel to a second terminal apparatus in a first time unit.

15. The apparatus according to claim 14, wherein the determining control information comprises:
determine the value of the first field based on the first start frequency domain unit index, the second start frequency domain unit index, the quantity of first frequency domain units, and a quantity of frequency domain units comprised in a sidelink resource pool.

16. The apparatus according to claim 14, wherein the control information further comprises a second field, wherein a value of the second field is used to determine a second time unit carrying the second data channel and a third time unit carrying the third data channel.

17. The apparatus according to claim 16, wherein the determining control information further comprises:

determining the value of the second field based on a first time domain interval ($T_{gap1}$) and a second time domain interval ($T_{gap2}$), wherein the first data channel, the second data channel, and the third data channel are located in different time units; and wherein:

$T_{gap1}$ is an interval between the first time unit and the second time unit, and $T_{gap2}$ is an interval between the first time unit and the third time unit; or $T_{gap1}$ is the interval between the first time unit and the second time unit, and $T_{gap2}$ is an interval between the second time unit and the third time unit.

18. The apparatus according to claim 17, wherein the determining the value of the second field based on $T_{gap1}$ and $T_{gap2}$ comprises:

when $(T_{gap2}-1) \leq \lfloor N_{slot}/2 \rfloor$, $TRIV=N_{slot}*(T_{gap2}-1)+T_{gap1}+W$ or $TRIV=N_{slot}*(T_{gap2}-1)+T_{gap1}$; and when $(T_{gap2}-1) > \lfloor N_{slot}/2 \rfloor$, $TRIV=N_{slot}*(N_{slot}-T_{gap2}+1)+(N_{slot}-1-T_{gap1})+W$ or $TRIV=N_{slot}*(N_{slot}-T_{gap2}+1)+(N_{slot}-1-T_{gap1})$, where:
TRIV represents the value of the second field;
W is a first time window, and
the first time unit, the second time unit, or the third time unit is located in the first time window; and
$N_{slot}$ is a maximum value of the first time domain interval or the second time domain interval, and
wherein $N_{slot}=W-2$, $0<T_{gap1} \leq N_{slot}-1$, and $1 \leq T_{gap2} \leq N_{slot}$.

19. The apparatus according to claim 18, wherein W is 32 and the second field has 9 bits.

20. The apparatus according to claim 14, wherein the control information further comprises a third field, wherein a relative location of a time unit of the first data channel is indicated as follows:

the third field having a first value indicates that the time unit of the first data channel is before a time unit of the second data channel and a time unit of the third data channel;

the third field having a second value indicates that the time unit of the first data channel is between the time unit of the second data channel and the time unit of the third data channel; and the third field having a third value indicates that the time unit of the first data channel is after the time unit of the second data channel and the time unit of the third data channel.

* * * * *

UNITED STATES PATENT AND TRADEMARK OFFICE
CERTIFICATE OF CORRECTION

| | |
|---|---|
| PATENT NO. | : 12,267,811 B2 |
| APPLICATION NO. | : 17/886214 |
| DATED | : April 1, 2025 |
| INVENTOR(S) | : Dong et al. |

Page 1 of 1

It is certified that error appears in the above-identified patent and that said Letters Patent is hereby corrected as shown below:

In the Claims

Claim 11: Column 34, Line 2: "$N_{slot}$, where:" should read as -- $N_{slot}$, wherein: --.

Claim 14: Column 34, Line 50: "data channel, or a third data channels; wherein the first" should read as -- data channel, or a third data channel; wherein the first --.

Claim 18: Column 36, Line 8: "wherein $N_{slot} = W-2$, $0 < T_{gap1} \leq N_{slot} - 1$, and $1 \leq T_{gap2} \leq N_{slot}$." should read as -- wherein $N_{slot} = W-2$, $0 \leq T_{gap1} \leq N_{slot} - 1$, and $1 \leq T_{gap2} \leq N_{slot}$. --.

Signed and Sealed this
Eleventh Day of November, 2025

John A. Squires
*Director of the United States Patent and Trademark Office*